United States Patent
Kohno et al.

(10) Patent No.: US 6,996,468 B2
(45) Date of Patent: Feb. 7, 2006

(54) VEHICLE-MOUNTED EQUIPMENT, INFORMATION UNIT, AND VEHICLE-MOUNTED INFORMATION SYSTEM

(75) Inventors: Atsushi Kohno, Tokyo (JP); Yoshihiko Utsui, Tokyo (JP); Mitsuo Shimotani, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 113 days.

(21) Appl. No.: 10/287,498

(22) Filed: Nov. 5, 2002

(65) Prior Publication Data

US 2004/0204822 A1  Oct. 14, 2004

(30) Foreign Application Priority Data

May 8, 2002  (JP)  .............................. 2002-132969

(51) Int. Cl.
*G01C 21/32* (2006.01)

(52) U.S. Cl. .................................................... 701/200

(58) Field of Classification Search ................ 701/200, 701/211, 216; 340/286.01, 286.02, 988–995
See application file for complete search history.

(56) References Cited

U.S. PATENT DOCUMENTS

| | | | |
|---|---|---|---|
| 6,600,930 B1 * | 7/2003 | Sakurai et al. | 455/414.3 |
| 6,633,809 B1 * | 10/2003 | Aizono et al. | 701/200 |
| 2002/0143466 A1 * | 10/2002 | Mutoh | 701/207 |

FOREIGN PATENT DOCUMENTS

| | | |
|---|---|---|
| JP | 9-189566 | 7/1997 |
| JP | 11-325944 | 11/1999 |
| JP | 2002-13943 | * 1/2002 |

OTHER PUBLICATIONS

Ibaraki, Toshihide, "Algorithm and Data Structure", Dec. 1, 1989, pp. 39-41.

* cited by examiner

*Primary Examiner*—Thu V. Nguyen
(74) *Attorney, Agent, or Firm*—Leydig, Voit & Mayer, Ltd.

(57) ABSTRACT

When a car navigation unit receives a remotely inputted command transmitted from a personal digital assistant (PDA), the remotely inputted command is interpreted to generate display data. The display data is transmitted to the PDA.

8 Claims, 27 Drawing Sheets

| INPUT KEY | KEY CODE | INPUT COMMAND |
|---|---|---|
| ROUTE SEARCH | 0x01 | NAVI: ROUTE SEARCH |
| DETERMINE | 0x02 | NAVI: DETERMINE |
| CANCEL | 0x03 | NAVI: CANCEL |
| CURRENT POSITION | 0x04 | NAVI: CURRENT POSITION |
| ↑ | 0x05 | NAVI: ↑ |
| ↓ | 0x06 | NAVI: ↓ |
| ← | 0x07 | NAVI: ← |
| → | 0x08 | NAVI: → |

FIG.7
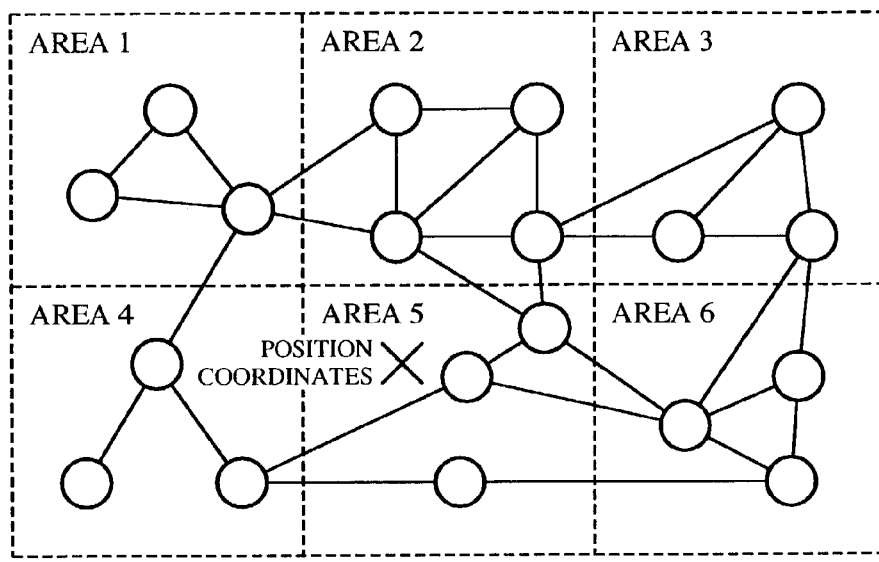
FIG.8
| CURRENT POSITION INFORMATION | N 35.21.0.0. LATITUDE, E 135.42.0.0. LONGITUDE |
| --- | --- |
| USER'S COMMAND STATE | FACILITY SEARCH STATE |
| DESTINATION INFORMATION | PENDING |
FIG.10
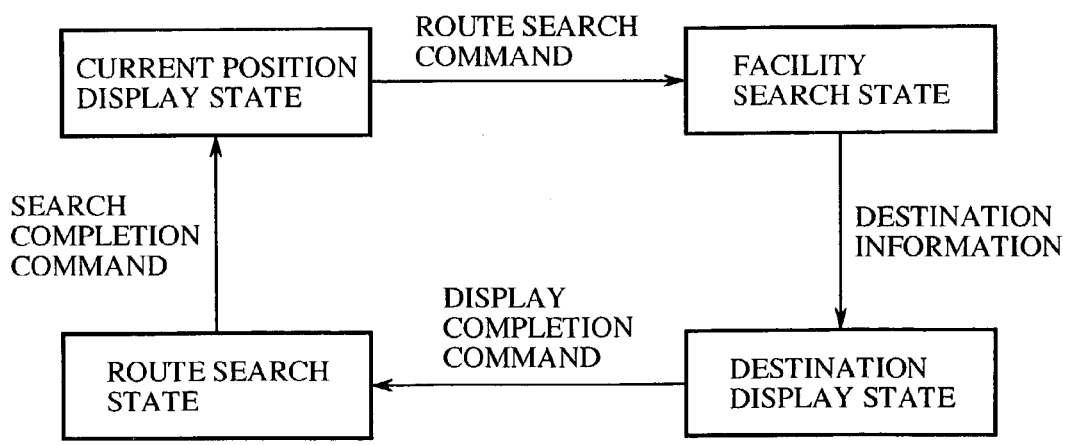

FIG.14
| NODE INFORMATION | LINK INFORMATION ||
|---|---|---|
| | LINK NAME | CONNECTION NODE |
| M POSITION | ROUTE 7 | M-N |
| N POSITION | ROUTE 13 | N-F |
| F POSITION | ROUTE 17 | F-J |
| J POSITION | ✕ | ✕ |
FIG.15
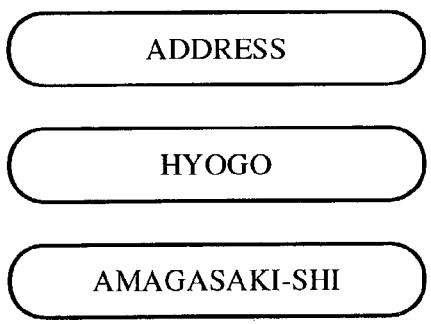
FIG.16A  FIG.16B
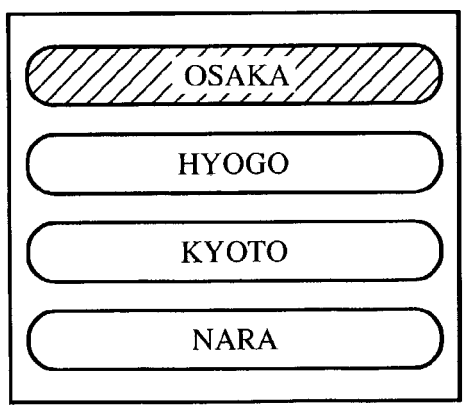
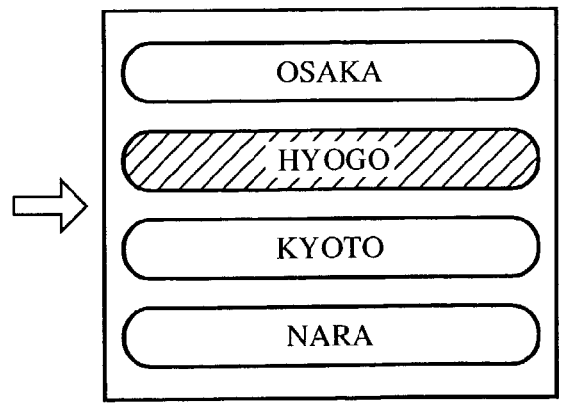

NODE OBJECT

LINK OBJECT

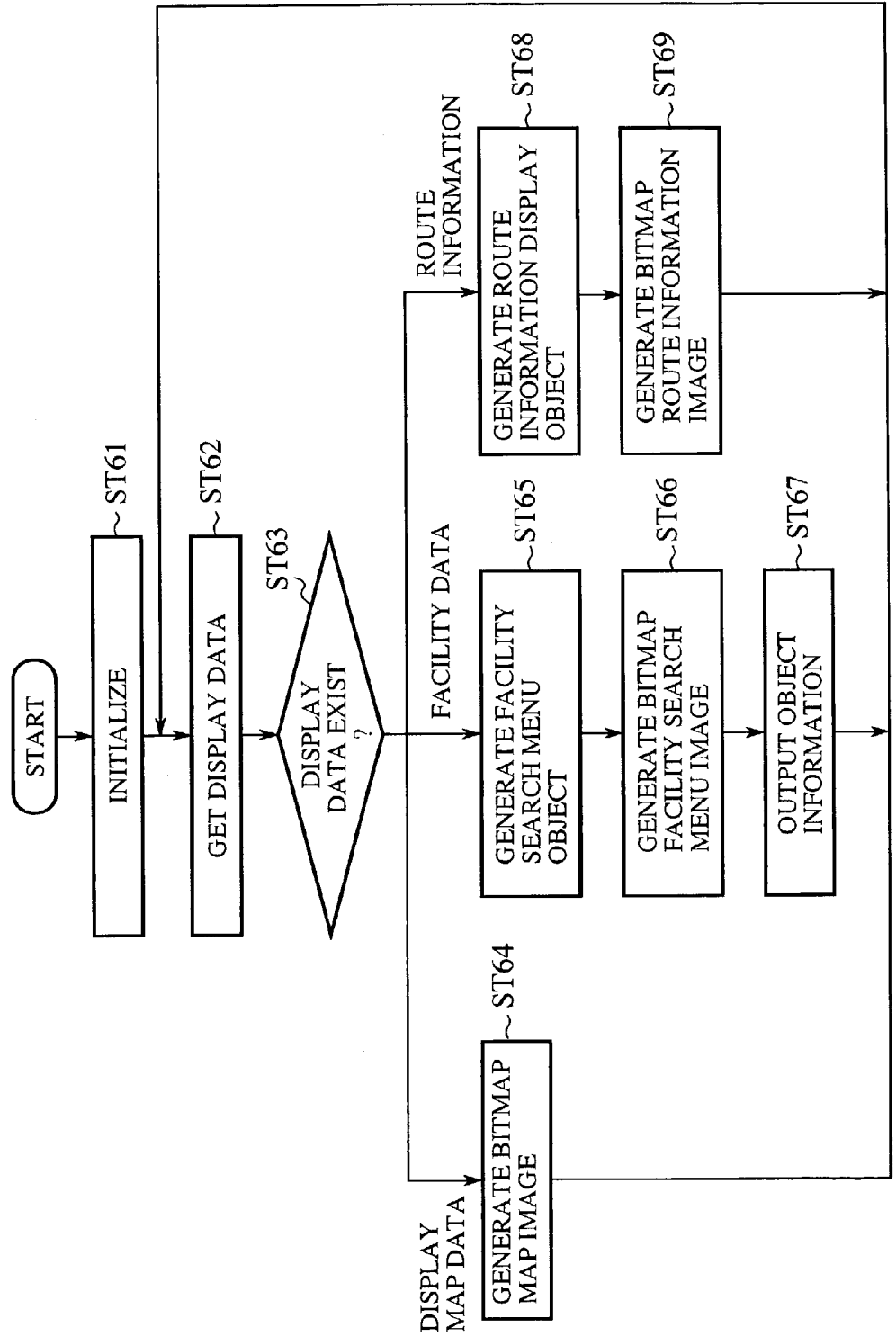

FIG.21A     FIG.21B
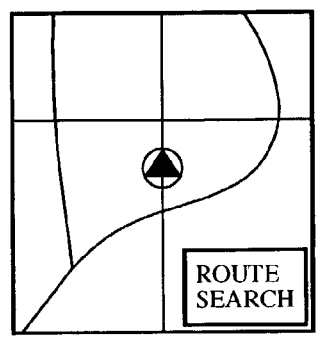 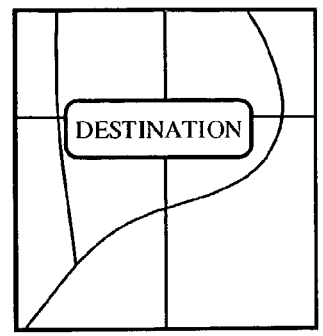
FIG.22
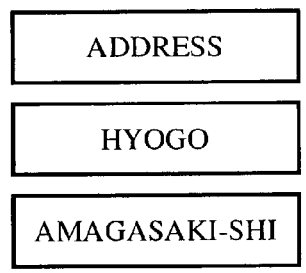
FIG.23
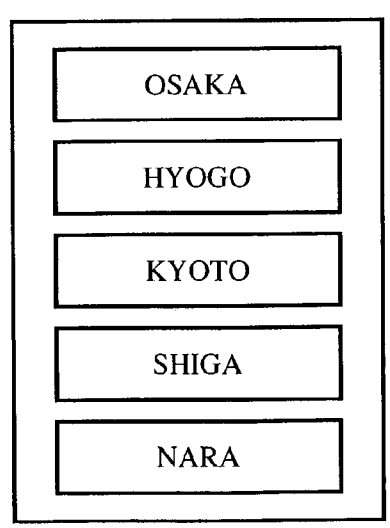

| LIST ITEM | OBJECT PART NAME |
|---|---|
| HYOGO | buttom1.bmp |
| OSAKA | buttom2.bmp |
| KYOTO | buttom3.bmp |
| NARA | buttom4.bmp |

HYOGO
buttom1, bmp

OSAKA
buttom2, bmp

KYOTO
buttom3, bmp

NARA
buttom4, bmp

FIG.30

```
START
  ↓
GET FACILITY SEARCH MENU OBJECT  — ST81
  ↓
INITIALIZE DISPLAY OBJECT INFORMATION  — ST82
  ↓
EXTRACT OBJECT NAME  — ST83
  ↓
PASTE OBJECT  — ST84
  ↓
DETECT OBJECT POSITION  — ST85
  ↓
GENERATE BITMAP FACILITY SEARCH IMAGE  — ST86
  ↑_____|
```

FIG.31

| OBJECT NAME | OBJECT POSITION COORDINATES | |
| --- | --- | --- |
| | UPPER LEFT COORDINATES | LOWER LEFT COORDINATES |
| HYOGO | (10, 5) | (50, 20) |
| OSAKA | (10, 25) | (50, 40) |
| KYOTO | (10, 45) | (50, 60) |
| NARA | (10, 65) | (50, 80) |

FIG.33
| LIST ITEM | OBJECT PART NAME |
|-----------|------------------|
| HYOGO | BUTTON SHAPE 1 |
| OSAKA | BUTTON SHAPE 2 |
| KYOTO | BUTTON SHAPE 1 |
| NARA | BUTTON SHAPE 2 |
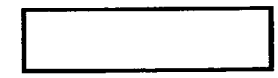
BUTTON SHAPE 1
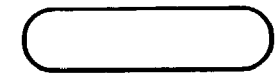
BUTTON SHAPE 2
FIG.34
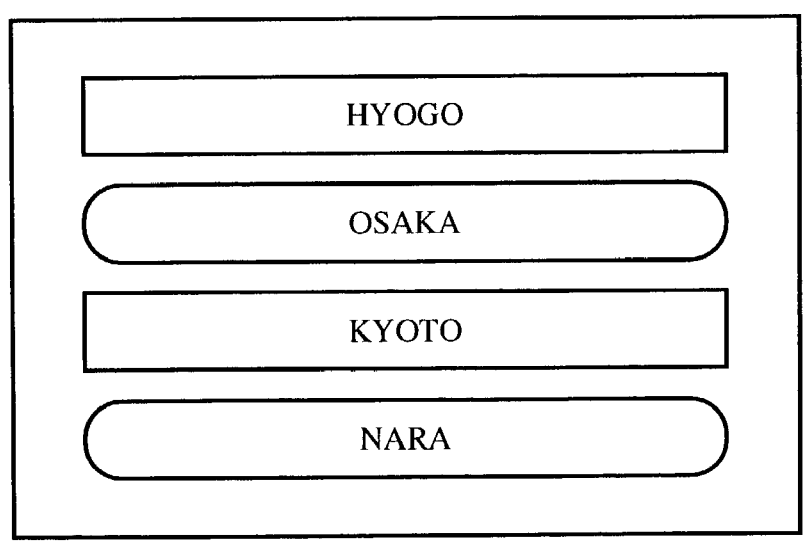

| OBJECT NAME | OBJECT PART NAME | OBJECT POSITION COORDINATES | |
|---|---|---|---|
| | | UPPER LEFT COORDINATES | LOWER LEFT COORDINATES |
| HYOGO | buttom1.bmp | (10, 5) | (50, 20) |
| OSAKA | buttom2.bmp | (10, 25) | (50, 40) |
| KYOTO | buttom3.bmp | (10, 45) | (50, 60) |
| NARA | buttom4.bmp | (10, 65) | (50, 80) |

FIG.39

[PREVIOUS PAGE] [NEXT PAGE]

FIG.40

| OSAKA |
| HYOGO |
| KYOTO |

[PREVIOUS PAGE] [NEXT PAGE]

VEHICLE-MOUNTED EQUIPMENT, INFORMATION UNIT, AND VEHICLE-MOUNTED INFORMATION SYSTEM

BACKGROUND OF THE INVENTION

1. Field of the Invention

This invention relates to a vehicle-mounted equipment which is remotely controlled from the outside of the vehicle, an information unit which remotely controls the vehicle-mounted equipment, and a vehicle-mounted information system which is configured by the vehicle-mounted equipment and the information unit.

2. Description of Related Art

As vehicle-mounted equipment there have appeared a car navigation system, a car audio system, or the like, which are mounted on a passenger vehicle. Also, as an information unit there are appeared a personal digital assistant (PDA), a personal computer, a cellular phone, or the like.

The conventional car navigation system forces a user to input data on destination and driving routes inside the vehicle before starting the driving. This work takes a lot of time, and thus the user experiences inconvenience in that the vehicle cannot be started immediately for the destination, even if the user has got onboard the vehicle.

In order to remove this inconvenience, the Inter Navi System (registered trademark) has been devised in which the position coordinates (latitude and longitude) of the destination are searched by a server connected to the Internet or a personal computer owned by an individual and the position coordinates of the destination are set to the car navigation system.

That is, in the Inter Navi System (registered trademark) the Inter Navi Server connected to the Internet makes a search for the destination upon receipt of an access from the user s personal computer. The position coordinates of the destination, which are the result of search, are then stored in a place called My cabin in the Inter Navi Server.

Thereafter, the user gets the position coordinates of the destination stored in the My cabin in the Internet server by a cellular phone connected to the car navigation system. The position coordinates of the destination are set in the car navigation system.

Once the position coordinates of the destination are set, the car navigation system makes a route search from the current position to the destination in order to do navigation at the time of running of the vehicle.

The conventional vehicle-mounted information system thus arranged enables the user to set the destination before the user gets onboard the vehicle. If, as a result of route search from the current position to the destination, the route in question does not meet the user's wishes, the user must set, inside the vehicle, the position(s) which the user passes through so as to search again for the route. It follows that, even if the user has got onboard the vehicle, the user cannot immediately start for the destination.

In addition, the screens displayed inside the vehicle when the user set positions through which the vehicle will pass may be significantly different from those displayed when the user sets the destination using a personal computer. Therefore, the user has a feeling of physical disorder in setting the position(s) which the user passes through.

Aside from the above-described prior art, the following vehicle-mounted information system is also disclosed in Published Unexamined Japanese Patent Application No. Hei 11-325944.

Namely, a navigation unit with capabilities similar to those of the vehicle-mounted navigation system is separately provided. Before the user gets onboard a vehicle, the navigation unit is operated to set the destination and then the destination is stored in a remote controller.

Thereafter, the destination stored in the remote controller is transferred to the navigation system mounted on the vehicle, which sets the destination.

This conventional system enables the user to set the destination before the user gets onboard the vehicle. However, it is necessary to separately provide another navigation unit with capabilities similar to those of the navigation system mounted on the vehicle. Thus, the cost tends to become high.

SUMMARY OF THE INVENTION

This invention has been made to solve the above-described and other problems, and has an object of providing a vehicle-mounted information system in which a user, without separately providing an equipment with capabilities similar to those of the vehicle-mounted equipment, can finish the setting of the destination, the position(s) at which the user passe(s) through, or the like, before the user gets onboard the vehicle.

Further, another object of this invention is to provide a vehicle-mounted equipment which is remotely controlled from the outside of the vehicle.

Further, yet another object of this invention is to provide an information unit which is capable of remotely controlling the vehicle-mounted equipment.

In order to attain the above and other objects, in the vehicle-mounted equipment according to this invention, when a command transmitted from the information unit is received, display data is generated by interpreting the command, and the display data is transmitted to the information unit.

Therefore, according to this invention, the vehicle-mounted equipment permits the user to finish the setting of the destination and the point(s) at which a user passe(s) through without separately providing, outside the vehicle, an equipment with the capabilities similar to those of the vehicle-mounted equipment. As a result, the vehicle can start immediately after the user has got onboard the vehicle.

Further, in the information unit according to this invention, while a command corresponding to an input signal is transmitted to the vehicle-mounted equipment, display data transmitted from the vehicle-mounted equipment is received to display a screen based on the display data. Therefore, the setting of the destination and the point(s) at which a user passe(s) through can be finished before the user gets onboard the vehicle.

Still further, the vehicle-mounted information system according to this invention is provided with a vehicle-mounted equipment which, upon receipt of a command from the information unit, generates display data by interpreting the command to transmit the display data to an information unit. Therefore, the vehicle-mounted information system allows the user to finish the setting of the destination and the point(s) at which a user passe(s) through without separately providing, outside a vehicle, an equipment with the capabilities similar to those of the vehicle-mounted equipment. As a result, the vehicle can start immediately after the user has got onboard the vehicle.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 7 is an explanatory drawing showing graph-structured map data;

FIG. 8 is an explanatory drawing showing a system state of the car navigation;

FIG. 10 is a state transition diagram showing the transition of a user's command state;

FIG. 14 is an explanatory drawing showing an example of route information;

FIG. 15 is an explanatory drawing showing an example of a bitmap facility search menu image;

FIGS. 16A and 16B are explanatory drawings showing an example of bitmap facility search image;

FIG. 20 is a flow chart showing the creation and transmission of an object in the display control unit;

FIGS. 21A and 21B are explanatory drawings showing examples of bitmap map images;

FIG. 22 is an explanatory drawing showing an example of facility search menu object;

FIG. 23 is an explanatory drawing showing an example of bitmap facility search menu image;

FIG. 30 is a flow chart showing the generation of bitmap facility search menu image in the display control unit of the car navigation unit;

FIG. 31 is an explanatory drawing showing an example of display object information;

FIG. 33 is an explanatory drawing showing an example of facility search menu object information;

FIG. 34 is an explanatory drawing showing an example of bitmap facility search menu image;

FIG. 39 is an explanatory drawing showing an example of display object;

FIG. 40 is an explanatory drawing showing an example of bitmap facility search menu image;

DETAILED DESCRIPTION OF PREFERRED EMBODIMENTS

The preferred embodiments of this invention will now be described below with reference to the attached drawings.

First Embodiment

Figure 1:
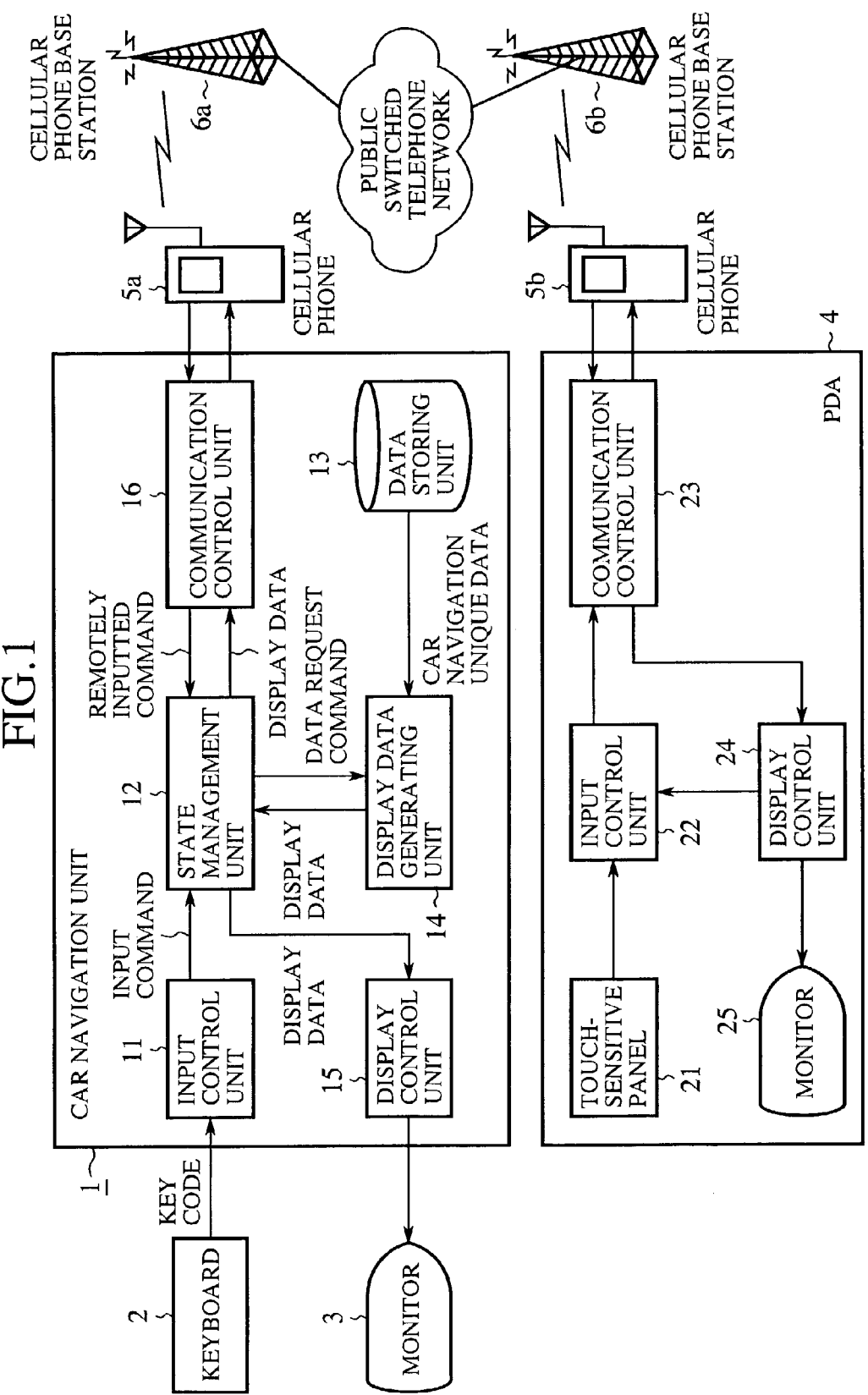
FIG. 1 is a block diagram showing a vehicle-mounted information system according to a first embodiment of this invention.

FIG. 1 is a block diagram showing a vehicle-mounted information system according to the first embodiment of this invention.

Referring to FIG. 1, reference numeral 1 denotes a car navigation unit (a vehicle-mounted equipment), reference numeral 2 a keyboard of a remote controller, or the like, such as remote controller for controlling the car navigation unit 1, reference numeral 3 a monitor of the car navigation unit 1, reference numeral 4 a personal digital assistant (PDA: information unit) for remotely controlling the car navigation unit 1, reference numeral 5a a cellular phone connected to the car navigation unit 1, reference numeral 5b a cellular phone connected to the PDA 4, reference numerals 6a, 6b cellular phone base stations, and reference numeral 7 a public switched telephone network.

Reference numeral 11 denotes an input control unit (command generating means) which outputs, upon receipt of a key code (input signal) from the keyboard 2, an input command corresponding to the key code. Reference numeral 12 denotes a state management unit which controls the state of the car navigation unit 1. The state management unit 12 is provided with capabilities of converting the input command outputted from the input control unit 11 and the remotely inputted command outputted from a communication control unit 16 into a data request command depending on the state of the car navigation unit 1.

Reference numeral 13 denotes a data storing unit in which the map data for car navigation (map data consisting of facilities search, display, and route search) is stored. Reference numeral 14 denotes a display data generating unit (data generating means) which generates, upon receipt of a data request command from the state management unit 12, display data in response to the data request command. Reference numeral 15 denotes a display control unit (display means) which generates an object from the display data generated by the display data generating unit 14 so as to display the object on the monitor 3. Reference numeral 16 denotes a communication control unit (receiving means, transmitting means) which receives the remotely inputted command transmitted from the PDA 4 and also transmits the display data generated by the display data generating unit 14 to the PDA 4.

Reference numeral 21 denotes a touch-sensitive panel, and reference numeral 22 an input control unit (command generating means) which, upon receipt of touch position information (input signal) of the user from the touch-sensitive panel 21, outputs a remotely inputting command corresponding to the touch position information. Reference numeral 23 denotes a communication control unit (communication means) which transmits the command outputted from the input control unit 22 to the car navigation unit 1 and also receives the display data transmitted from the car navigation unit 1. Reference numeral 24 denotes a display control unit (display means) which generates the object from the display data received by the communication control unit 23 so as to display the object on the monitor 25. Reference numeral 25 denotes a monitor of the PDA 4.

Figure 2:
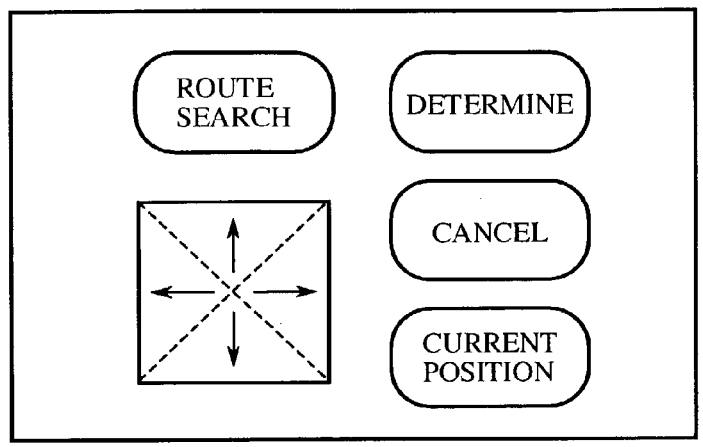
FIG. 2 is an explanatory drawing showing an example of a keyboard.

FIG. 2 is an example of the keyboard denoted by reference number 25 in FIG. 1. The exemplary keyboard includes directional buttons, as well as "ROUTER SEARCH," "DETERMINE," "CANCEL," and "CURRENT POSITION" buttons for inputting commands to the car navigation unit, denoted by reference numeral 1 in FIG. 1.

Figure 3:
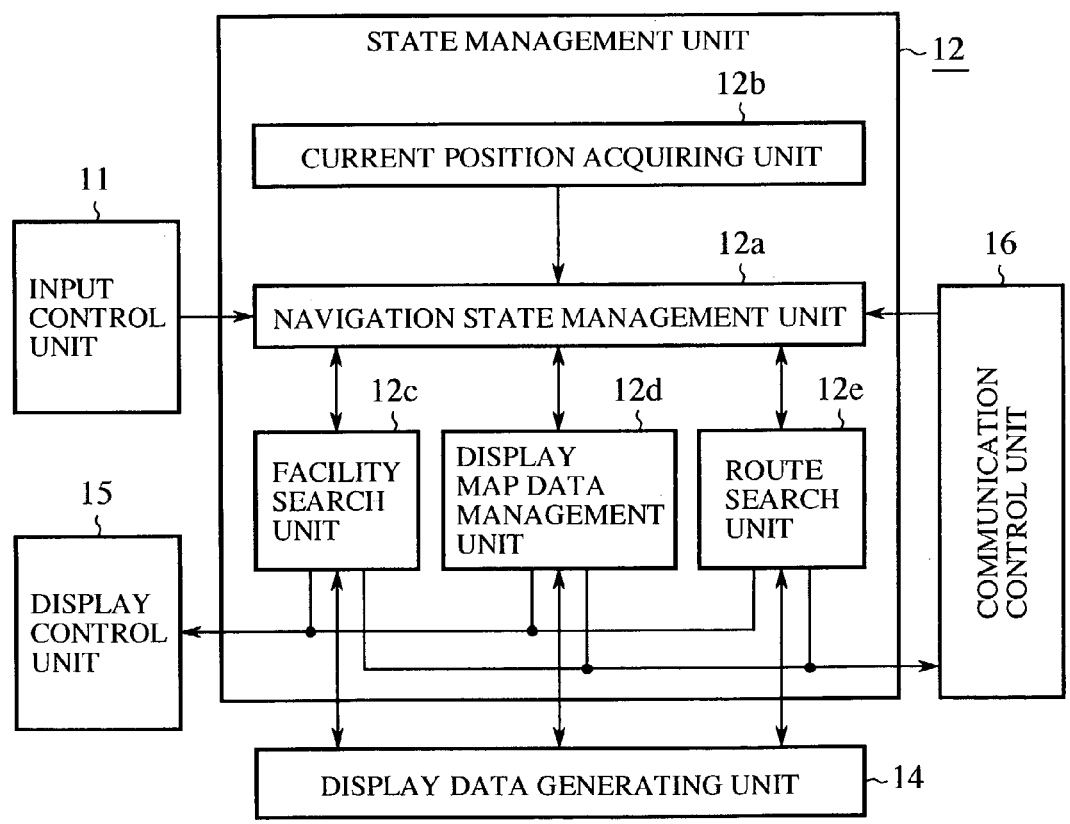
FIG. 3 is a block diagram showing an internal configuration of a state management unit.

FIG. 3 is a block diagram showing an internal configuration of the state management unit 12.

Referring to FIG. 3, reference numeral 12a denotes a navigation state management unit which performs the state update of the car navigation unit 1. Reference numeral 12b denotes a current position acquiring unit for calculating the current position of the vehicle by receiving global positioning system (GPS) signals from GPS satellites. Reference numeral 12c denotes a facility search unit, which outputs the input command outputted from the input control unit 11 the display generating unit 14 after converting it to the data request command, and also outputs the display data generated by the display date generating unit 14 to the display control unit 15. Further, the facility search unit 12c outputs the remotely inputted command received by the communication control unit 16 to the display data generating unit 14 after converting it to the data request command, and also outputs the display data generated by the display generating unit 14 to the communication control unit 16.

Reference numeral 12d denotes a display map data control unit, which outputs the current position information and the destination information outputted from the navigation state management unit 12a to the display data generating unit 14. In addition, the display map data control unit 12d outputs the display data generated by the display data generating unit 14 to the display control unit 15 or to the communication control unit 16, and outputs a display completion command to the navigation state management unit 12a. Reference numeral 12e denotes a route search unit, which outputs the current position information and the destination information outputted from the navigation state management unit 12a the display data generating unit 14. Besides, the route search unit 12e outputs the display data generated by the display data generating unit 14 to the display control unit 15 or to the communication control unit 16, and outputs the search completion command to the navigation state management unit 12a.

The operation of the first embodiment will now be described.

In case the user begins setting of the destination and the point(s) at which the user passe(s) through, before getting onboard the vehicle, the user operates the PDA 4 to transmit the remotely inputting command to the car navigation unit 1, whereby the car navigation unit 1 is remotely controlled. The operations of the PDA 4 will go into the detail later.

In case the user gets onboard the vehicle to actually start the route search after the user has finished the setting of the destination and the point(s) at which the user passe(s) through, the user operates the keyboard as shown in FIG. 2.

Figures 4, 6:
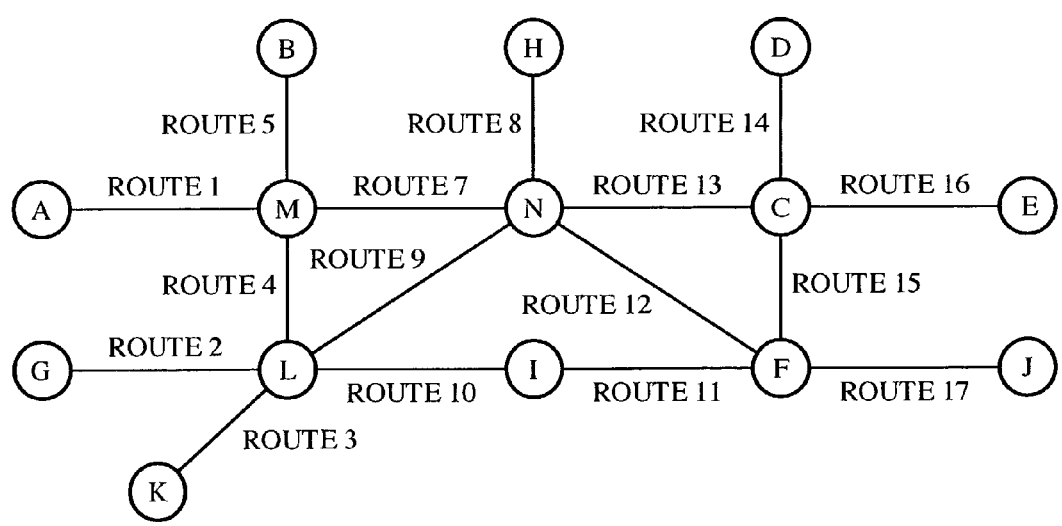
FIG. 4 is an explanatory drawing showing a correspondence table of a keyboard and input commands.
FIG. 6 is an explanatory drawing showing graph-structured map data.

A unique key code has been assigned to each of the keys in the keyboard, as shown in FIG. 4. When the user pushes any one of the keys, the key code assigned to the key is outputted.

When a key code is received from the keyboard 2, the input control unit 11 looks up the reference table listed therein in correspondence with each other the key code and the inputted command as shown in FIG. 4, thereby outputting an input command corresponding to the key code to the state management unit 12.

In the correspondence table in FIG. 4, in order to discriminate the input command from the remotely inputted command transmitted from the PDA 4, a prefix "navi:" is attached to the head of the input command. The remotely inputted command has attached a prefix of "remote:" to the head thereof.

When an input command is outputted from the input control unit 11 or when a remotely inputted command is received by the communication control unit 16, the state management unit 12 converts the input command or the remotely inputted command to the data request command depending on the state of the car navigation unit 1. The data request command is then outputted to the display data generating unit 14.

A more specific description will be given to the processing in the state management unit 12.

Figure 9:
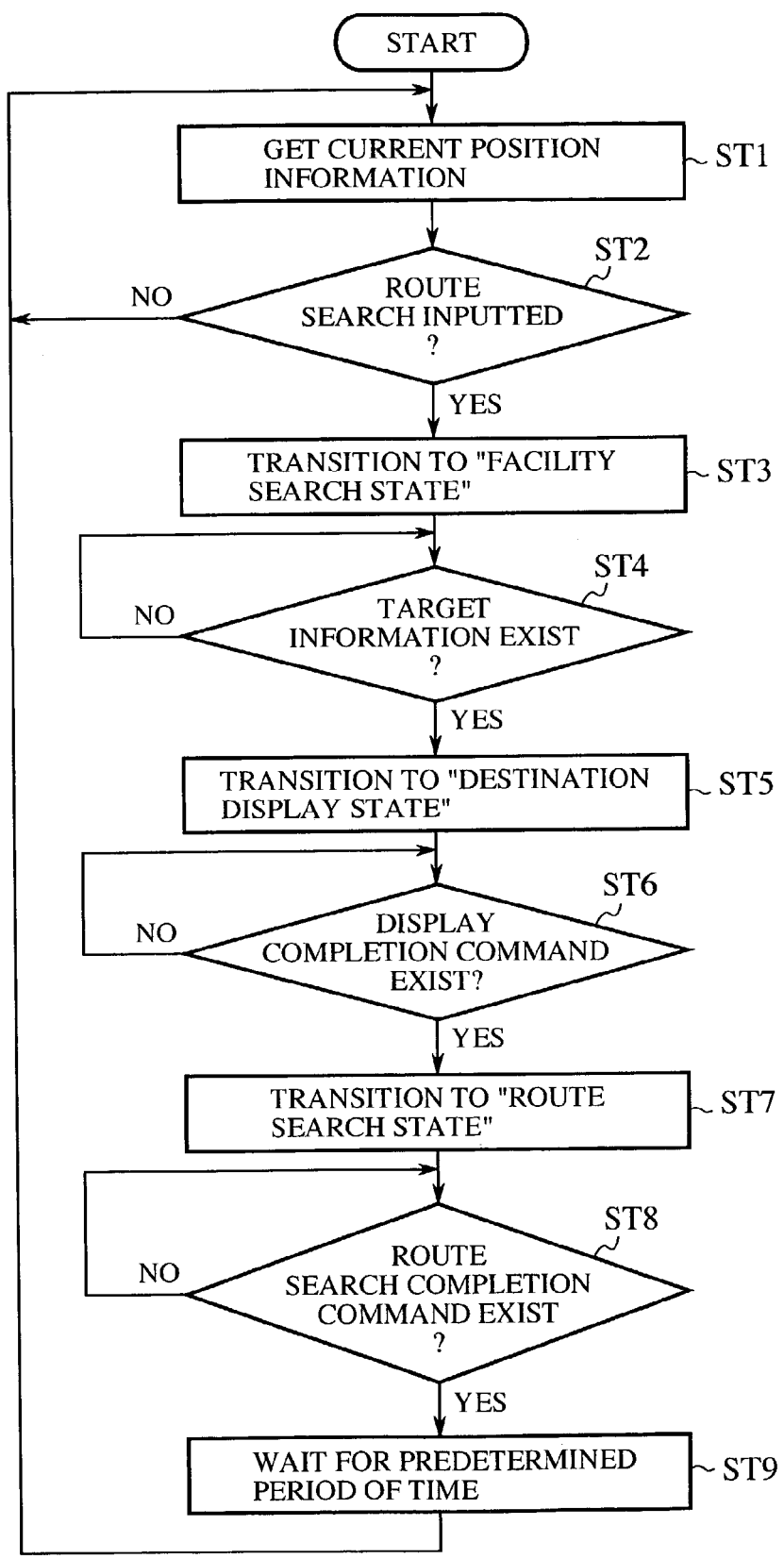
FIG. 9 is a flow chart showing the state update of the car navigation unit.

First, when the current position acquiring unit 12b calculates the current position of the vehicle and outputs the current position information, the navigation state management unit 12a of the state management unit 12 gets the current position information (step ST1 in FIG. 9). After setting the user's command to "current position display" (see FIG. 10), a decision is made as to whether the input command is "navi: route search" or not, or else, as to whether the remotely inputted command is "remote: route search" or not (step ST2).

In case the input command or the remotely inputted command is not "route search," the navigation state management unit 12a returns to step ST1. Otherwise, the navigation state management unit 12a changes the user's command state to "facility search state" as shown in FIG. 10 and also outputs "navi: route search" which is the input command or "remote: route search" which is the remotely inputted command to the facility search unit 12c (step ST3).

Then, the navigation state management unit 12a repeats the "facility search state" until the destination information is outputted from the facility search unit 12c (step ST4). Once the destination information is outputted from the facility search unit 12c, the navigation state management unit 12a gets the destination information and changes the user's command state to "destination display state" (step ST5).

Thereafter, until the display completion command is outputted from the display map data control unit 12d, the navigation state management unit 12a repeats the "destination display state" (step ST6). Once the display completion command is outputted from the display map data control unit 12d, the navigation state management unit 12a changes the user's command state to "route search state" after waiting for a predetermined period of time (step ST7).

Then, until the search completion command is outputted from the route search unit 12e, the navigation state management unit 12a repeats the "route search state" (step ST8). Once the search completion command is outputted from the route search unit 12e, the navigation state management unit 12a returns to step ST1 after waiting for a predetermined period of time (ST9).

Figure 11:
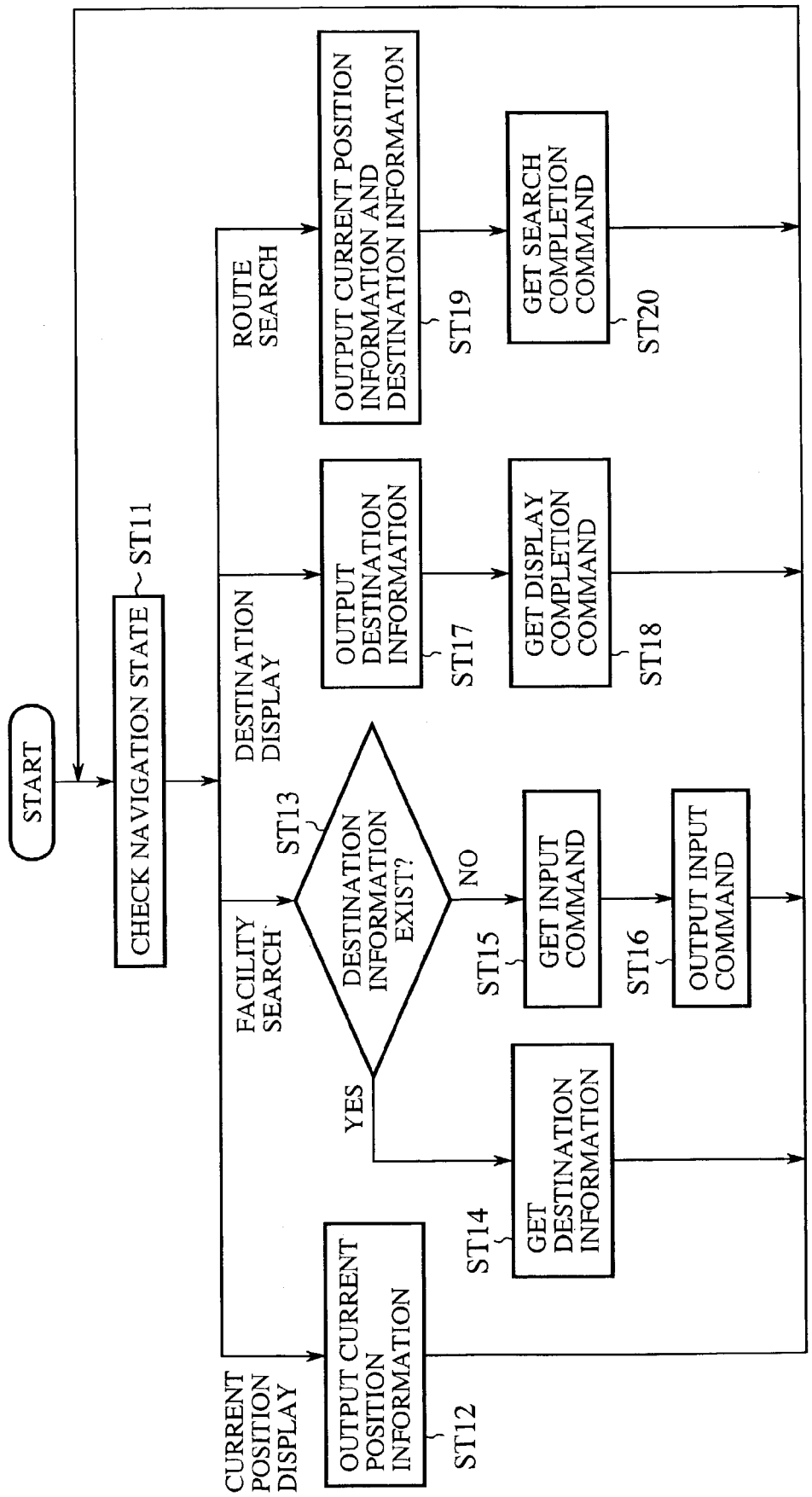
FIG. 11 is a flow chart showing processing branched, depending on each state.

The navigation state management unit 12a changes the user's command state as described above. The processing in each of the states will now be described with reference to FIG. 11.

First, in order to judge the system state of the car navigation (see FIG. 8), the navigation state management unit 12a checks the user's command state (step ST11). If the user's command state is the current position display state, the current position information obtained from the current position acquiring unit 12b is outputted to the display map data control unit 12d (step ST12), and the process returns to step ST11.

The navigation state management unit 12a checks the user's command state (step ST11) and, if the user's command state is the facility search state, a confirmation is made as to whether the destination information has been outputted or not from the facility search unit 12c (step ST13). If the destination information is outputted from the facility search unit 12c, the destination information is obtained (step ST14), and the process returns to step ST11. Otherwise, an input command is obtained from the input control unit 11 or a remotely inputted command is obtained from the communication control unit 16 (step ST15). The input command or the remotely inputted command is outputted to the facility search unit 12c (step ST16), and the process returns to step ST11.

The navigation state management unit 12a checks the user's command state (step ST11) and, if the user's command state is the destination display state, the destination-information obtained from the facility search unit 12c is outputted to the display map data control unit 12d (step ST17). The display completion command is obtained from the display map data control unit 12d (step ST18), and the process returns to step ST11.

The navigation state management unit 12a checks the user's command state (step ST11) and, if the user's command state is the route search state, the current position information obtained from the current position acquiring unit 12b and the destination information obtained from the facility search unit 12c are outputted to the route search unit 12e (step ST19). The search completion command is obtained from the route search unit 12e (step ST20), and the process return to step ST11.

Figure 12:
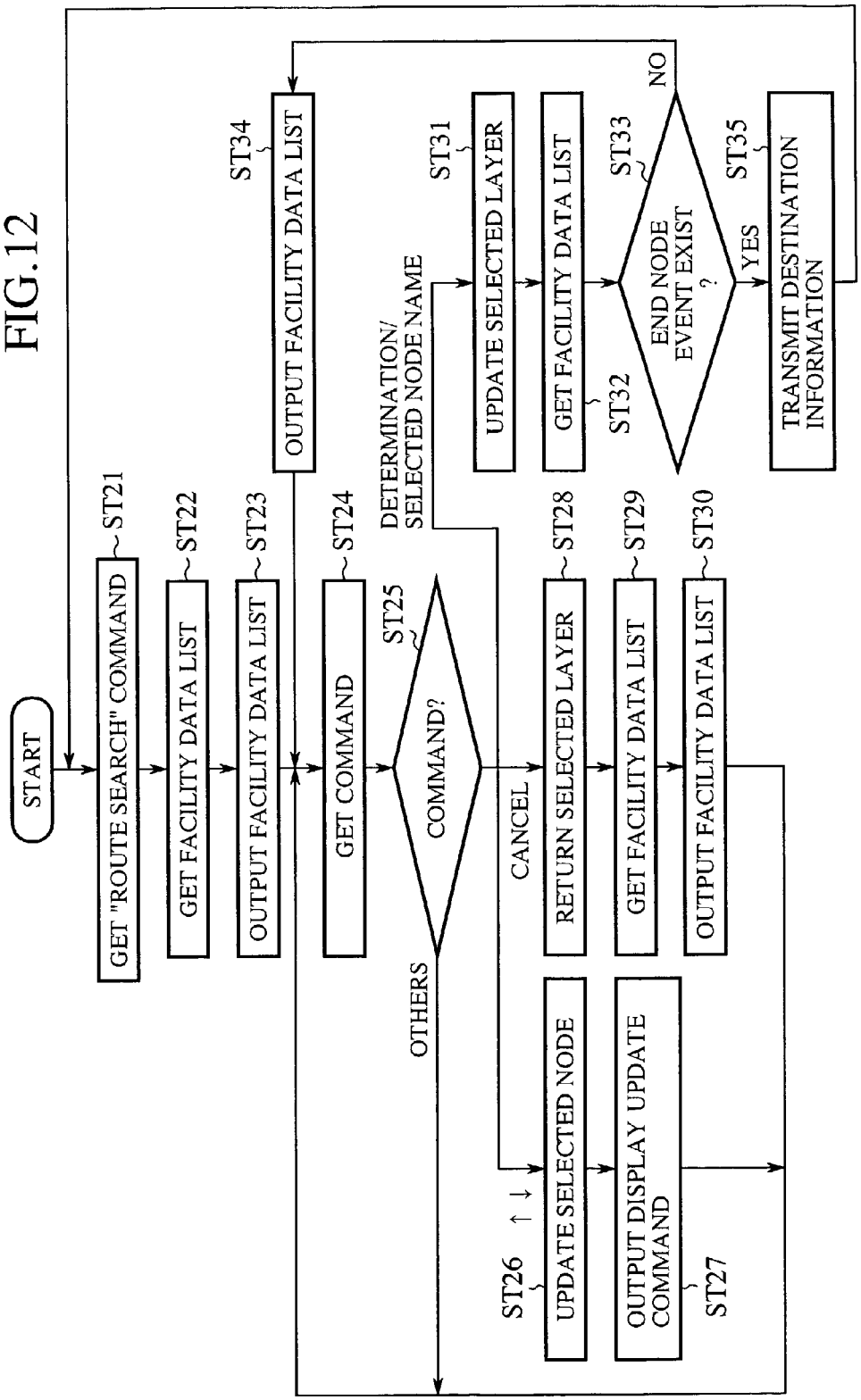
FIG. 12 is a flow chart showing the facility search in a facility search unit.

The facility search of the facility search unit 12c will be hereinafter described with reference to FIG. 12.

Figure 5:
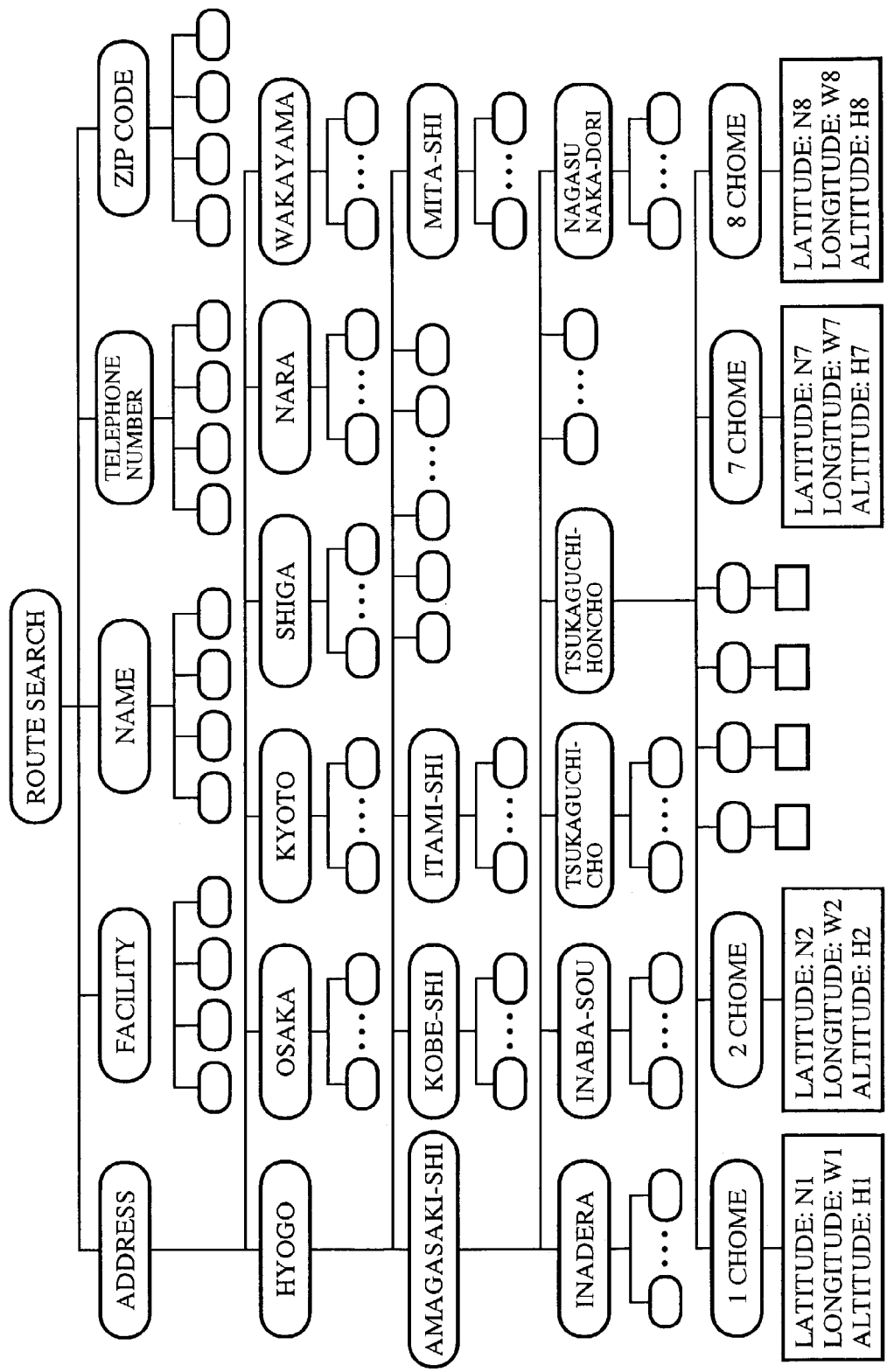
FIG. 5 is an explanatory drawing showing tree-structured facility data.

Hereupon, it is assumed that the facility search unit 12c has information on a selected layer and a selected node. The selected layer represents the node position in the tree-structured facility search map data as shown in FIG. 5. For example, by concatenating the name of each node by a colon (:) like "route search: address: Osaka," the node position can be specified.

In addition, the selected node represents, in case of the child node (corresponding to Hyogo, Osaka, Kyoto, Shiga, Nara, Wakayama in, e.g., "route search: address") in the selected layer, which of the nodes the user has selected. The display data to be generated by the display data generating unit 14 is a node group of the facility search map data. The facility search unit 12c gets them as a facility data list (in case the above-described selected layer is, e.g., "route search, address, facility, name, telephone number and zip code" form the facility data list).

First, if "navi: route search" as an input command or "remote: route search" as a remotely inputted command is received from the navigation state management unit 12a (step ST21), the facility search unit 12c sets the selected layer to "route search" and the selected layer is outputted to the display data generating unit 14.

If the facility data list is obtained from the display data generating unit 14 as the display data (step ST22), the facility search unit 12c outputs the facility data list and a selected node to the display control unit 15 or to the communication control unit 16 as a first item in the facility data list (step ST23). In other words, if the command inputted from the navigation state management unit 12a is the input command outputted from the input control unit 11, the facility-data list and the selected node are outputted to the display control unit 15. If the command in question is the remotely inputted command received from the communication control unit 16, the facility data list and the selected node are outputted to the communication control unit 16.

The facility search unit 12c gets the input command or the remotely inputted command from the navigation state management unit 12a (step ST24) and interprets the character string exclusive of the head five or seven characters ("navi:" or "remote:") of the command and checks the command (step ST25).

In case the command is "↑" or "↓," the facility search unit 12c changes the immediately previous item or the next item on the facility data list into the selected node (step ST26), and outputs the changed selected node and the display update command to the display control unit 15 (step ST27). The process then returns to step ST24.

In case the command is "cancel," the facility search unit 12c sets the selected layer to the host node of the currently selected layer (it can be implemented by deleting on and after the last colon in the selected layer) (step ST28). In case the selected node is "route search," however, the selected layer will not be updated.

Then, the selected layer after update is outputted to the display generation unit 14 and gets the display data (facility date list) generated by the display data generating unit 14 (step ST29). The first item in the facility data list is defined as the selected node and outputs the newly obtained facility data list and the selected node to the display control unit 15 or to the communication control unit 16 (step ST30). A determination as to where the newly obtained facility data list and the selected node are outputted takes the same way as step ST23.

If the command is "determined" or the item name in the facility data list (item name is received as the remotely inputted command), the facility search unit 12c sets the selected node or the name of the selected node of the remotely inputted command to the selected layer (step ST31). In the same manner as the processing at steps ST22 and ST23, the node group of the selected layer is obtained as the facility data list from the display data generating unit 14 and take the first item of the list as the selected node (step ST32).

If the obtained facility data is an end node (destination information), the end node event is obtained from the display data generating unit 14 together with the above-described facility data list. If there is no end node event (step ST33), the facility data list and the selected node are outputted to the display control unit 15 or to the communication control unit 16 (step ST34), and the process returns to step ST24. A determination as to where the facility data list and the selected node are outputted takes the same way as step ST23.

If there is an end node event, the obtained facility data list (only one node as the node itself) is outputted to the navigation state management unit 12a as the destination information (step ST35), which follows the same step as step ST21.

A description will then be given to the processing of the display data generating unit 14 for the facility search of the facility search unit 12c.

If the selected layer is obtained from the facility search unit 12c, the display data generating unit 14 reads the facility data of the child node in the selected layer from the data storing unit 13, thereby generating the facility data list. The facility data list is outputted to the facility search unit 12c.

The tree-structured facility data stored in the data storing unit 13 are implemented by the eldest-son/second-son expression (regarding the eldest-son/second-son expression, see a publication entitled "algorithm and data structure" written by Toshihide Ibaraki and published by Shokodo). In addition, when the facility data is read out, a check is made as to whether the eldest son exists in the read out node. If the eldest son is not existed (i.e., if the node is a leaf), the end node event is transmitted together with the facility data to the facility search unit 12c.

A description will then be given to the acquisition of the display data in the display map data control unit 12d.

Once the current position information or the destination information is obtained from the navigation state management unit 12a, the display map data control unit 12d outputs the position coordinates of the current position information or the destination information to the display data generating unit 14.

Once the position coordinates of the display map information or the destination information are obtained from the display map data control unit 12d, the display data generating unit 14 cuts a part of the display map data stored in the data storing unit 13 by a method as will be described hereinbelow depending on the position coordinates and the predetermined range of display. The display map data is outputted to the display map data control unit 12d as the display map data.

Once the display data is obtained from the display data generating unit 14, the display map control unit 12d outputs the display data and the position category information indicating whether the displayed position is the current position or the destination to the display control unit 15 or to the communication control unit 16. A determination as to where the display data and the position category information are transmitted takes same way as the facility search unit 12c.

The display map data control unit 12d outputs the display completion command to the navigation state management unit 12a.

A description will then be given to the cutting of the display data in the display data generating unit 14.

Once the current position information or the destination information is obtained from the display map data control unit 12d, the display data generating unit 14 judges as to which area of the display map data the position coordinates exist. One area which contains therein the position information is selected and the graph-structured display map information included in the area in question is generated as the display data. In FIG. 7, assuming that the position coordinates obtained from the display map data control unit 12d are the point marked by "X", the node and the link contained inside the area 5 are taken as the display data.

A description will then be given to the acquisition of the route information (see FIG. 14) in the route search unit 12e.

Once the current position information and the destination information are obtained from the navigation state management unit 12a, the route search unit 12e outputs the current position information and the destination information to the display data generating unit 14, and the route information outputted from the display data generating unit 14 is outputted to the display control unit 15 or to the communication control unit 16. A determination as to where the route information is outputted takes the same way as the facility search unit 12c.

The route search unit 12e outputs the search completion command to the navigation state management unit 12a.

The generation of the route information in the display data generating unit 14 for the route search unit 12e is performed by looking up the graph structure of the route search map data shown in FIG. 6. This processing takes the same way as the route search in the conventional car navigation system, and therefore detailed descriptions thereof are omitted for brevity's sake. Among a plurality of routes found in the route search, at least one route is outputted to the route search unit 12e as the route information as shown in FIG. 14.

A description will then be given to the generation of the screen data in the display control unit 15.

Figure 13:
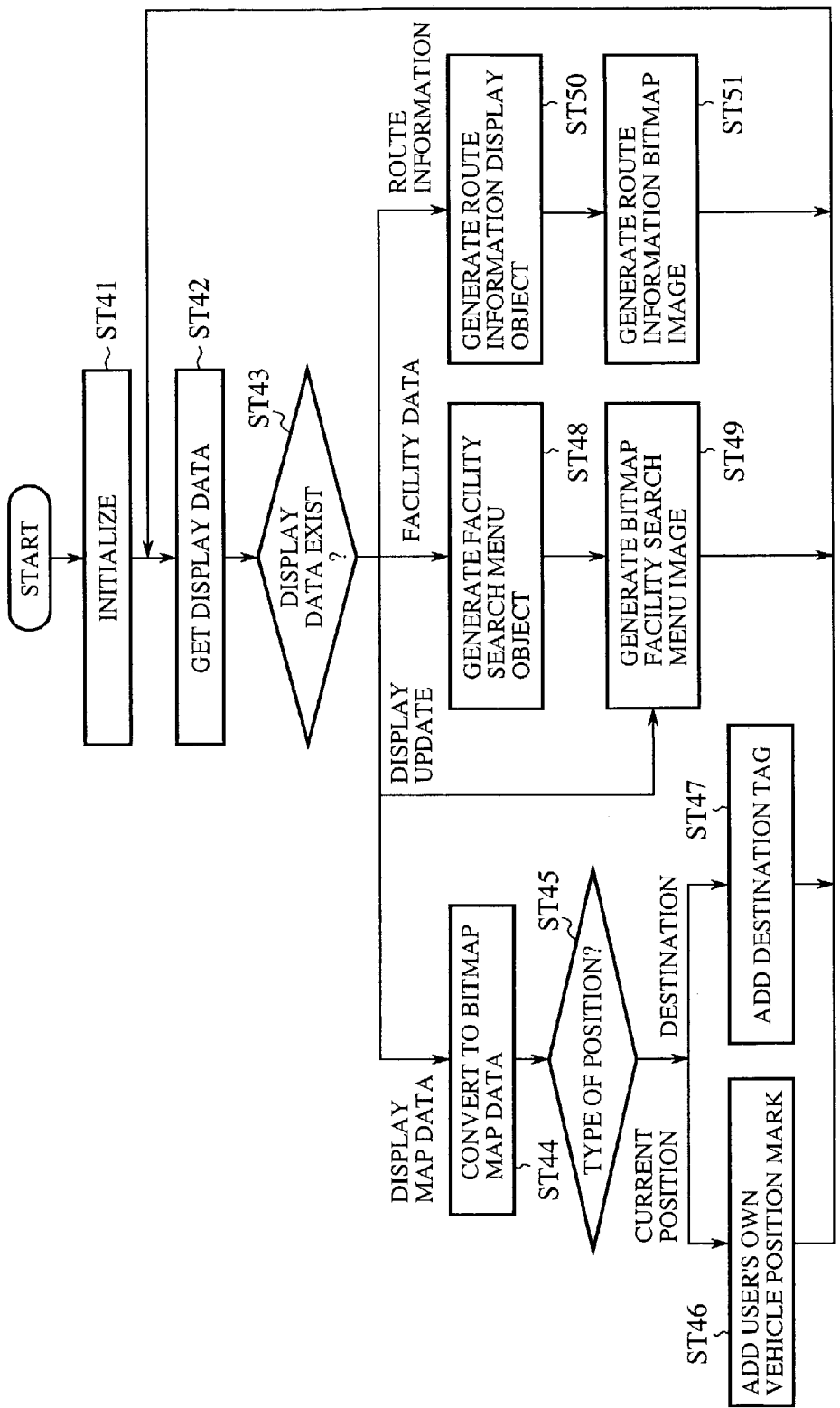
FIG. 13 is a flow chart showing the screen data generation in a display control unit.

When the internal memory for screen generation is initialized (step ST41 in FIG. 13) and the display data is obtained from the state management unit 12 (step ST42), the display control unit 15 judges the data category of the display data (step ST43).

If the display data is display map data and the position category information, the display control unit 15 performs the conversion of the graph-structured display map data into the bitmap map data (step ST44) and, if the position category is the current position (step ST45), a mark of the user's vehicle position is added to the bitmap map image developed from the bitmap map data (step ST46).

Figure 19A:
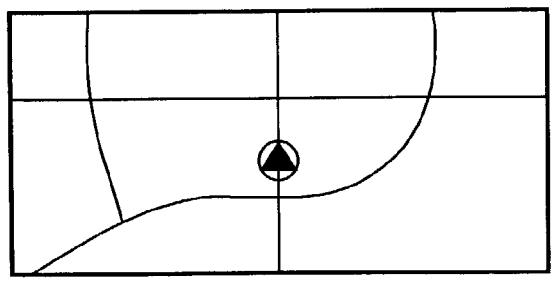
FIGS. 19A and 19B are explanatory drawings showing examples of bitmap map images.
Figure 19B:
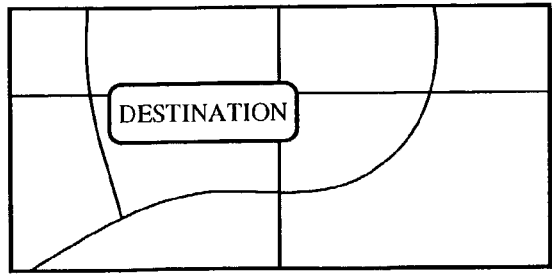

If the position category is the destination, a destination tag is added to the bitmap map image (step ST47) as shown in FIG. 19B.

If the display data is the facility data list, the display control unit 15 generates a facility search menu object as shown in FIG. 15 from each of the items of the facility data list (step ST48). By allocating the facility search menu object on the memory, a bitmap facility search menu image as shown in FIGS. 16A and 16B is generated (step ST49). Only the object of the selected node outputted from the state management unit 12 is generated in color different from that of other objects.

If the display data is display update command and the selected node, the display control unit 15 generates the bitmap facility search menu image by changing the color of the object of the selected node (by returning the color of the object to the original one) to generate the bitmap facility search menu image. For example, if the display update command and "Hyogo" are obtained in a state of FIG. 16A, the screen data will be shown in FIG. 16B.

Figure 17A:
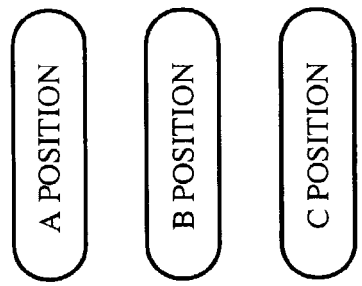
FIGS. 17A and 17B are explanatory drawings showing examples of route information display objects.
Figure 17B:
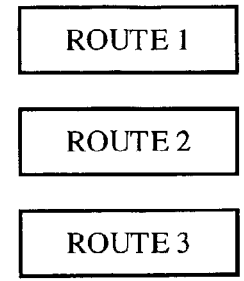
Figure 18:
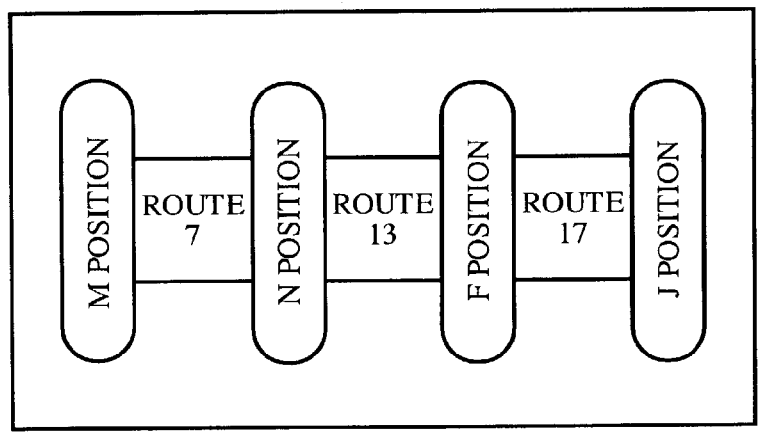
FIG. 18 is an explanatory drawing showing an example of a bitmap route information image.

In case the display data is route information, the display control unit 15 generates a node object shown in FIG. 17A from the node information in the route information and also a link object is generated as shown in FIG. 17B from the link name (step ST50). Based on the connection node between each of the objects and the link information, the combination between the node object and the link object is judged, thereby generating a bitmap route image shown in FIG. 18 (step ST51).

The detailed conversion from the graph-structured display map data to the bitmap map data follows the same step as that of the map data in the conventional car navigation system, and therefore detailed descriptions thereof are omitted for brevity's sake.

A description will then be given to the processing of the PDA 4.

When the communication control unit 23 receives the display data transmitted from the car navigation unit 1, the display control unit 24 of the PDA 4 generates an object from the display data, and displays the object on the monitor 25 and also outputs the information on the object to the input control unit 22.

When the input control unit 22 receives the information on the object from the display control unit 24 as displayed on the monitor 25 upon receipt of the user's touch position information from the touch-sensitive panel 21, the input control unit 22 generates a remotely inputting command by a method to be mentioned later and outputs the remotely inputting command to the communication control unit 23.

When the remotely inputting code is received from the input control unit 22, the communication control unit 23 transmits the remotely inputting code to the car navigation unit 1 by way of the cellular phone 5b.

The user's touch-sensitive panel information indicates the position coordinates (X-coordinate and Y-coordinate) of the touch-sensitive panel 21 touched by the user. Detection of the position coordinates takes the same way as the conventional touch-sensitive panel, and therefore detailed descriptions thereof are omitted for brevity's sake.

A description will then be given to the generation and transmission of the object in the display control unit 24 with reference to FIG. 20.

The display control unit 24 initializes the internal memory for image data generation/store (step ST61), and gets the display data received by the communication control unit 23 (step ST62). Then, the data category of the display data is judged (step ST63).

When the display data is display map data and the position category information, the display control unit 24 generates, in the same manner as the display control unit 15 of the car navigation unit 1, the bitmap map image shown in FIG. 21A in terms of the current position, and a bitmap map image shown in FIG. 21B in terms of the destination (step ST64).

In the case of the bitmap map image of the current position, the "route search" object is pasted on the bitmap data shown in FIG. 21A, and outputs the object information of the "route search" object to the input control unit 22.

In case the display data is the facility data list, the display control unit 24 generates, from each item of the facility data list, the facility search menu object of the PDA shown in FIG. 22 (step ST65). By allocating the menu object on the memory, the bitmap facility search menu image shown in FIG. 23 is generated (step ST66).

Figure 26:
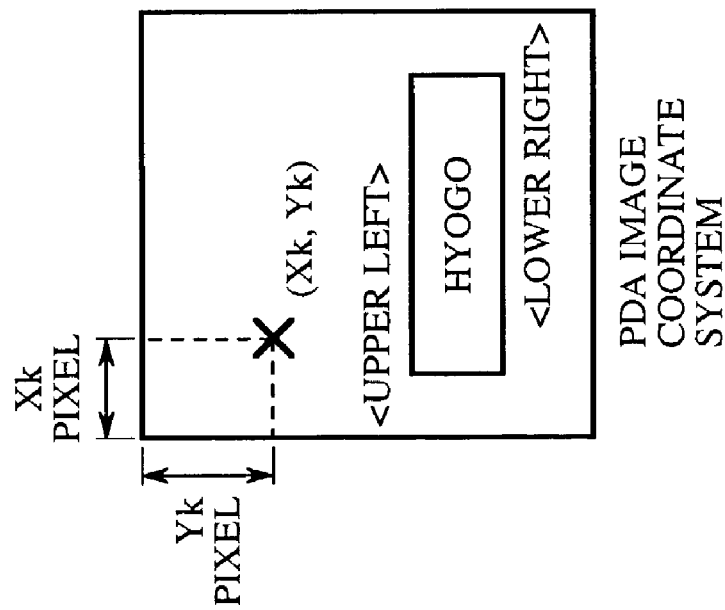
FIG. 26 is an explanatory drawing showing an example of object information.

Then, by combining each object (facility data item) and the position coordinates in the bitmap menu image (upper left coordinates and lower right coordinates in case of a rectangular object) to generate the object information shown in FIG. 26 (an example of the bitmap facility search menu image shown in FIG. 23) (step ST67), and the object information is outputted to the input control unit 22.

Figure 24:
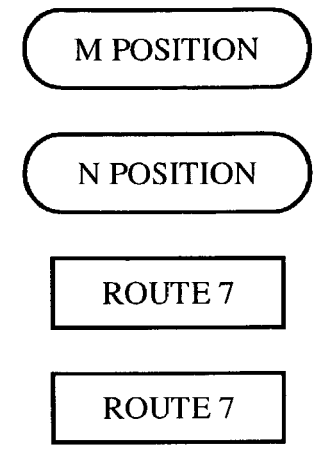
FIG. 24 is an explanatory drawing showing an example of route information display object.
Figure 25:
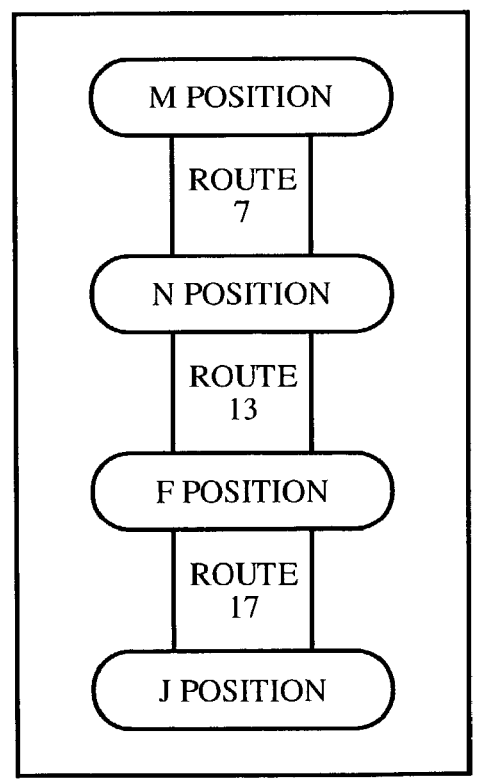
FIG. 25 is an explanatory drawing showing an example of bitmap route search information image.

In case the display data is the route information, the display control unit 24 generates the route information display object shown in FIG. 24 and the bitmap route information image shown in FIG. 25 by performing the same processing as the display control unit 15 of the car navigation unit 1 (steps ST68, ST69).

Figures 27, 29:
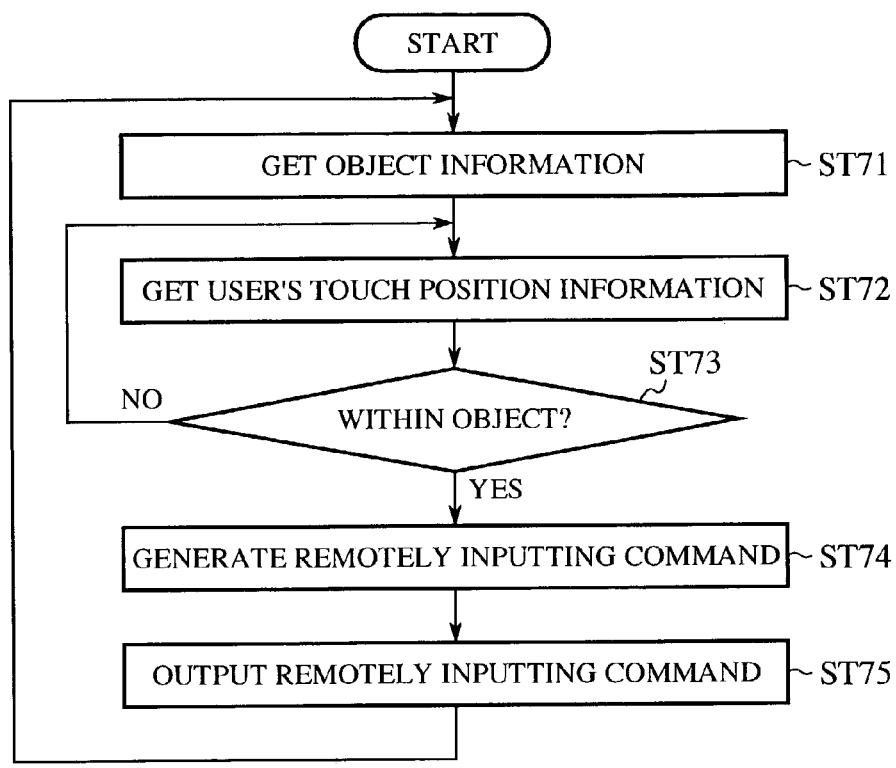
FIG. 27 is a flow chart showing the generation of a remotely inputted code in the input control unit.
FIG. 29 is an explanatory drawing showing objects corresponding to information.

A description will then be given to the generation of the remotely inputting code in the input control unit 22 with reference to FIG. 27.

When the input control unit 22 gets the object information from the display control unit 24 (step ST71) and the user's touch position information from the touch-sensitive panel 21 (step ST72), the input control unit 22 judges by a method to be mentioned later as to whether the position coordinates shown by the touch position information are included in the object position coordinates as shown in each object information (step ST73).

In case the position coordinates shown by the touch position information are not included, the process returns to step ST72. Otherwise, the name of the object including the position coordinates shown by the touch position information is defined as the remotely inputting code (step ST74) and outputs the remotely inputting code to the communication control unit 23 (step ST75). The process returns to step ST71.

The remotely inputting code generated by the input control unit 22 will be respective items (e.g., "Hyogo," "Osaka," "Amagasaki-shi") on the facility data list to be transmitted by the car navigation unit 1.

A description will then be given to the decision as to whether the position coordinates shown by the user's touch position information are included in the object position coordinates.

Figure 28A:
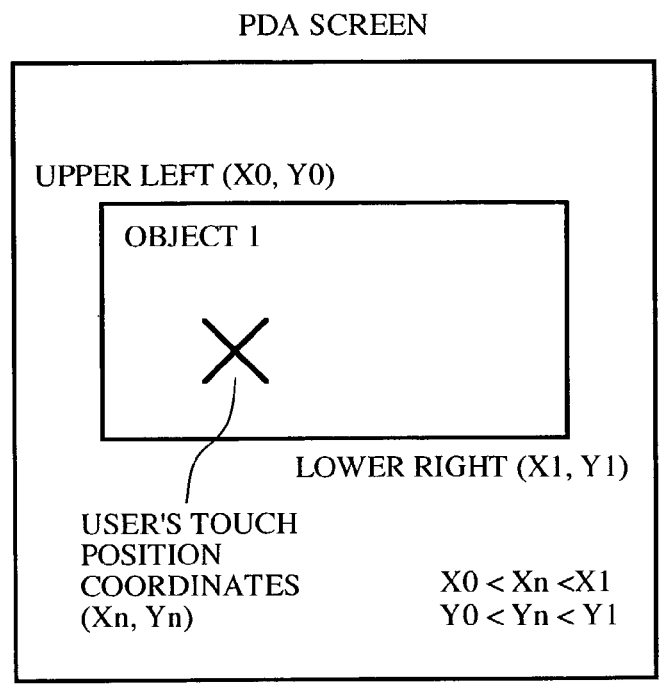
FIGS. 28A and 28B are explanatory drawings for explaining the determination of position coordinates.
Figure 28B:
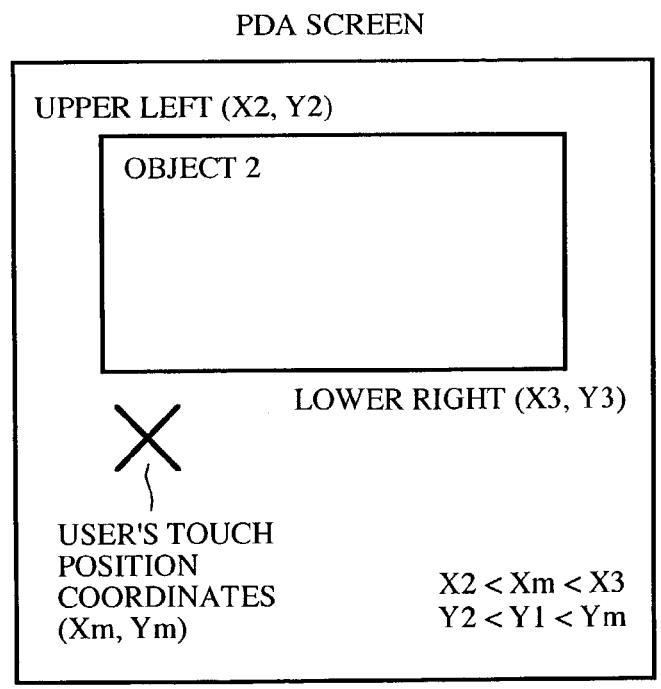

As shown in FIG. 28A, in case the X-coordinate (Xn) shown by the user's touch position information is above the upper-left X-coordinate (X0) and is below the lower-right X-coordinate (X1) of the object position coordinates in the referred object information, and also the Y-coordinate (Yn) shown by the user's touch position information is above the upper-left Y-coordinate (Y0) of and is below the lower-right Y-coordinate (Y1) of the object position coordinates in the referred object information, a judgement is made that the position coordinates fall within the object position coordinates. As shown in FIG. 28B, in case the above-described conditions are not met, a judgement is made that the position coordinates do not fall within the object position coordinates.

As is clear from the above descriptions, according to the first embodiment of this invention, when the car navigation unit 1 receives a remotely inputted command transmitted from the PDA 4, the remotely inputted command is interpreted to generate the display data, and the display data is transmitted to the PDA 4. Therefore, without separately providing an equipment with the capabilities similar to those of the car navigation unit 1, the setting of the destination and the point(s) at which a user passe(s) through can be finished before the user gets onboard the vehicle.

In addition, even in case a remotely inputted command is received from the PDA 4, the display data similar to that generated by an input command is generated for transmitting the display data to the PDA 4. Therefore, even in case the user operates the PDA 4 to set the destination, or the like, the user can operate the PDA 4 in the same sense as the direct operation of the car navigation unit 1.

Further, since there is no need of separately providing the data for the car navigation unit 1 and the data for the PDA 4, reduction of the consumption of the resources in the car navigation unit 1 can be expected. Still further, due to the fact that the common data is used, the reading unit of the data can be shared in common, with the result that a higher developing efficiency can be accomplished than the case where the reading unit of the data is separately provided.

Furthermore, since the PDA 4 generates the display screen based on the facility data and the route information transmitted from the car navigation unit 1, it becomes possible to generate the display screen fitted for the monitor 25 of the PDA 4.

According to the first embodiment, the dedicated keyboard 2 for the car navigation unit 1 is used as the input device. However, instead of the keyboard 2, a remote controller may be used which allows wireless communications by means of infrared rays, or the like. The transmission and reception of the remote controller can be realized in the same manner as that in the remote controller for the television set, videocassette recorder, or the like. Therefore, the detailed descriptions thereof are omitted for brevity's sake.

In the first embodiment, the touch-sensitive panel 21 is used as the input device for the PDA 4. Alternatively, as the input device of the car navigation unit 1, the touch-sensitive panel may also be used. In such a case, the operation of the input control unit 11 and the display control unit 15 can be actualized in the same manner as the PDA 4. Therefore, the detailed descriptions thereof are omitted for brevity's sake.

Further, the bitmap data of the display map data is transmitted to the PDA 4 as it is so as to be displayed on the monitor 25 of the PDA 4. the display map data control unit 12*d* may cut a part of the bitmap data for transmission, or the display control unit 24 of the PDA 4 may take a part of the bitmap as the display screen data.

Further, the graph-structured display map data is used as an example of the display map data. However, the map data of the bitmap format may also be used.

Still further, the car navigation unit 1 and the PDA 4 are communicated with each other through the cellular phones 5*a*, 5*b* and the public switched telephone network 7. Instead, the communication may be done through Bluetooth, wireless local area network (LAN), or the like.

Yet further, the PDA 4 is used as the information unit. Cellular phones or personal computers may also be applied, for instance.

Second Embodiment

While in the above-described first embodiment, the display data generating unit 14 generates the listed facility data such as "Hyogo, Osaka, Kyoto, Shiga, Nara, Wakayama" and the display control unit 15, 24 in the car navigation unit 1 and the PDA 4 generate the facility search menu object out of the listed facility data, the facility search menu object may be generated by the display data-generating unit 14 so as to output it to the display control unit 15 or to the communication control unit 16.

Details are given as under, and a reference is only made to the portions different from those in the first embodiment.

A description will then be given to the generation of the facility search menu object in the display date generating unit 14.

When the display data generating unit 14 reads out the facility data list from the data storing unit 13, the facility search menu object is generated (see FIG. 15) in the same manner as the display control unit 15 in the above first embodiment. An object unit name (e.g., button 1, button 2) is added to each of the objects, and a corresponding information is generated to show the correlation between each of the objects in the facility data list and the object unit name (see FIG. 29).

The display data generating unit 14 combines the information corresponding to the object, the facility search menu object, and the facility data list to create facility search menu object information.

A description will then be given to the generation of the bitmap facility search menu image of the display control unit 15 in the car navigation unit 1 with reference to FIG. 30.

In case the display control unit 15 holds the display object information shown in FIG. 31, once it gets the facility search menu object and the selected node as the display data from the facility search unit 12*c* (step ST81), the display object information is initialized (step ST82) and each of the items in the facility data list contained in the facility search menu object information is extracted, and each of the items is set in the object name in the display object information (step ST83).

Figure 32:
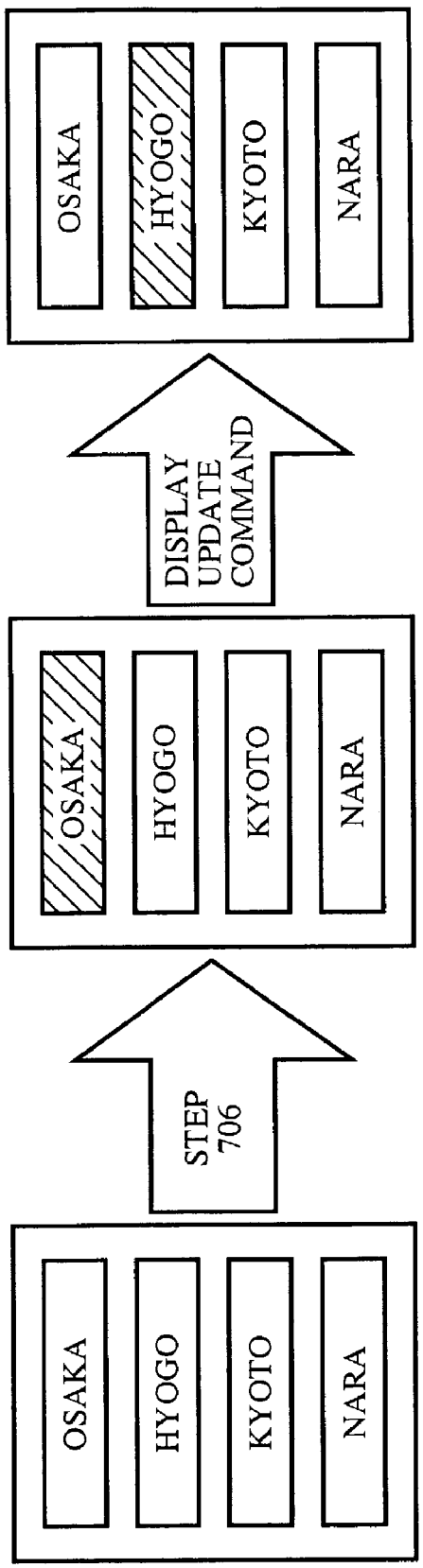
FIGS. 32A, 32B and 32C are explanatory drawings showing examples of bitmap facility search menu image.

The display control unit 15 uses the object corresponding information inside the facility search menu object to paste the object for facility search menu of the object unit name corresponding to the object name in the display object information on the memory for the display control unit 15, whereby a bit map image shown in FIG. 32A is generated (step ST84).

The display control unit 15 detects the position coordinates (e.g., upper-left coordinate and lower-right coordinate) of each of the pasted facility search menu object and sets it in the object position of the display object information (step ST85).

Then, the display control unit 15 changes the background color of the facility search menu object corresponding to the selected node obtained from the facility search unit 12*c* so as to highlight it, whereby the bitmap facility search menu image shown in FIG. 32B is generated (step ST86).

In case the selected node and the display update command have been obtained from the facility search unit 12*c*, the background color of the facility search menu object corresponding to the selected node on the memory inside the display control unit 15 may be changed and also the background color of the facility search menu object may be returned to the original one, which has been displayed in different background color (see FIG. 32C).

The generation of the facility search menu image in the display control unit 24 of the PDA 4 follows the same step as the display control unit 15 in the car navigation unit 1, and therefore detailed descriptions thereof are omitted for brevity's sake. However, since the highlight display is unnecessary to the PDA 4, the processing at step ST86 falls into disuse. In addition, the object information to be outputted to the input control unit 22 is identical with the display object information held inside the display control unit 24.

As is apparent from the above descriptions, according to the second embodiment, it becomes possible to operate the common object when the user operates the facility search menu. This promises the user a comfortable operation over the above first embodiment without a feeling of physical disorder. In addition, since it is unnecessary to generate the facility search menu object for the PDA 4, the load of processing on the PDA 4 can be reduced.

In the second embodiment, the facility data list and the facility search menu object can be transmitted only for the facility search map data. Instead, the route information display object (FIG. 17) may be generated and transmitted together with the route information for the route search map data. In such a case, the processing of the display control units 15, 24 of the car navigation unit 1 and the PDA 4 follows the same step as the display control unit 15, 24 of the second embodiment, and therefore detailed descriptions thereof are omitted for brevity's sake. Alternatively, the bitmap map data may be generated from the display map data in combination with the display map data for the display map data.

Further, the display data generating unit 14 generates the facility search menu object. The facility search menu object may however be stored previously in the data storing unit 13 and the display data generating unit 14 may read out the facility search menu object together with the facility data to output it to the facility search unit 12c. In this case, although the amount of data to be stored in the data storing unit 13 increases, the load of processing on the display data generating unit 14 can be reduced to the contrary.

Moreover, although the display data generating unit 14 generates the facility search menu object for each item of the facility data list, it may be generated and transmitted only the shape of the object. FIG. 33 shows an example of the facility search menu object in such a case, in which the display control unit 15, 24 of the car navigation unit 1 and the PDA 4 generates the bitmap facility search menu image shown in FIG. 34 from the obtained facility data list and the facility search menu object. In this case, since transmission of the object for each of the facility data list becomes useless, the traffic between the car navigation unit 1 and the PDA 4 can be reduced.

Third Embodiment

While in the above-described second embodiment, the display data generating unit 14 generates the facility search menu object and the facility search menu object is outputted to the display control unit 15 or to the communication control unit 16, the display data generating unit 14 may also output the position coordinates of the display screen in the facility search menu object (layout information) to the display control unit 15 or to the communication control unit 16.

Details are given under, and a description thereof is only made to the portions different from those in the second embodiment.

The display data generating unit 14 of the car navigation unit 1 determines, in addition to the generation of the facility search menu object in the above the second embodiment, the position coordinates on the display screen of each facility search menu object.

Figure 35:
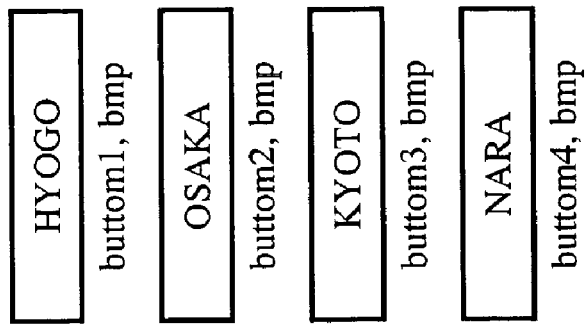
FIG. 35 is an explanatory drawing showing an example of facility search menu layout information.

Then, by combining the facility search menu object and the position coordinates, the facility search menu layout information shown in FIG. 35 is generated, and the facility search menu layout information is outputted to the facility search unit 12c.

Upon receipt of the facility search menu layout information from the display data generating unit 14, the facility search unit 12c outputs the facility search menu layout information to the display control unit 15 or to the communication control unit 16.

Upon receipt of the facility search menu layout information from the facility search unit 12c, the communication control unit 16 transmits the facility search menu layout information to the PDA 4.

In addition, upon receipt of the facility search menu layout information from the facility search unit 12c, the display control unit 15 generates a bitmap facility search menu image from the facility search menu layout information by a method to be mentioned later, thereby displaying it on the monitor 23.

When the communication control unit 23 receives the facility search menu layout information transmitted from the car navigation unit 1, the display control unit 24 of the PDA 4 generates a bitmap facility search menu image from the facility search menu layout information by a method to be mentioned later for further displaying it on the monitor 25. The display control unit 24 also generates the object information and outputs it to the input control unit 22.

A description will then be given to the generation of the bitmap facility search menu image in the display control unit 15 of the car navigation unit 1.

By using the facility search menu layout information, the display control unit 15 selects the facility search menu object of the object part name for each object name (each item in the facility data list).

Then, on the memory of the display control unit 15, the selected object is pasted to the coordinate position shown by the object position information in the facility search menu layout information.

The generation of the bitmap facility search menu image in the display control unit 24 of the PDA 4 can also be realized by a method similar to that in the display control unit 15 of the car navigation unit 1. But highlight display is unnecessary. The object information to be outputted to the input control unit 22 can be generated by extracting the object name and the object position coordinates out of the facility search menu layout information received from the car navigation unit 1.

As is clear from the above descriptions, according to the third embodiment, since the layout information of the object is also outputted to the display control unit 15 or to the communication control unit 16, the same screen (menu screen) can be displayed in both the car navigation unit 1 and the PDA 4. This removes a feeling of physical disorder of the user.

As described also in the second embodiment, in this third embodiment, the layout information on the facility data is transmitted. The display data generating unit 14 may however generate the route information layout information on the route information so as to output it to the state management unit 12 and the state management unit 12 may transmit each layout information to the display control unit 15, 24 of the car navigation unit 1 and the PDA 4. Further, instead of generating the layout information in the display data generating unit 14, the layout information may be stored in the data storing unit 13.

In this third embodiment, the object name, the object part name, and the object position coordinates are generated as the facility search menu layout information. The object name and the object position coordinates may however be generated as the facility search menu layout information and the display control units 15, 24 of the car navigation unit 1 and the PDA 4 may generate the facility search menu object.

Fourth Embodiment

While in the above third embodiment, the layout information of the object is also outputted to the display control unit 15 or to the communication control unit 16, the display data generating unit 14 may generate the bitmap facility search menu image and the facility search unit 12c may output, as the display data, the bitmap facility search menu image to the display control unit 15 or to the communication control unit 16.

Figure 36:
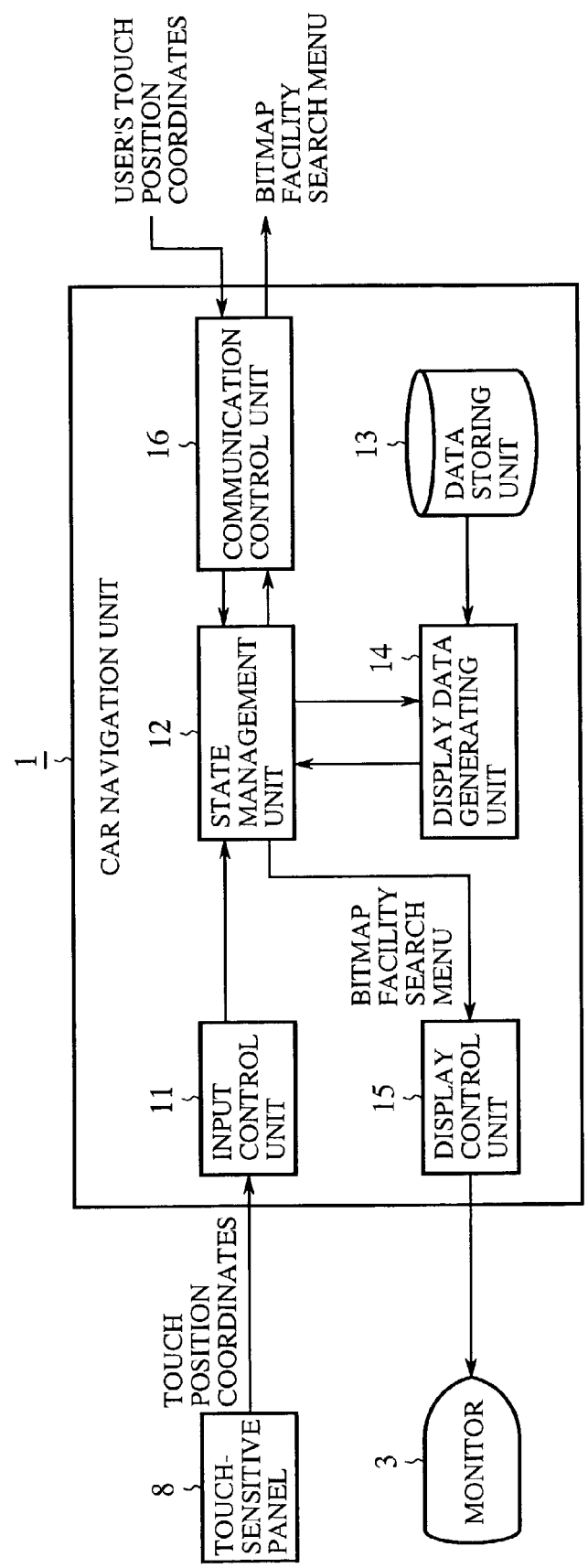
FIG. 36 is a block diagram showing a car navigation unit according to a fourth embodiment of this invention.

FIG. 36 is a block diagram showing the car navigation unit 1 according to the fourth embodiment. In FIG. 36, a touch-sensitive panel 8 is adopted as the input device instead of the keyboard 2.

This configuration is different from the above third embodiment in that the facility search unit 12c outputs the bitmap facility search menu image generated by the display data generating unit 14 to the display control unit 15 or to the communication control unit 16. However, the generation of the bitmap facility search menu image follows the same step as the display control unit 24 in the first embodiment, and therefore descriptions thereof are omitted for brevity's sake.

According to this fourth embodiment, since the bitmap facility search menu image generated by the display data generating unit 14 is outputted to the display control unit 15 or to the communication control unit 16, there is no need of generating the bitmap facility search menu image in the display control units 15, 24 of the car navigation unit 1 and the PDA 4, thus reducing the load of processing on the PDA 4.

In the fourth embodiment, the bitmap facility search menu image associated with the facility data is transmitted. The bitmap route image associated with the route information may also be generated so as to output it to the display control units 15, 24 of the car navigation unit 1 and the PDA 4.

Figure 37:
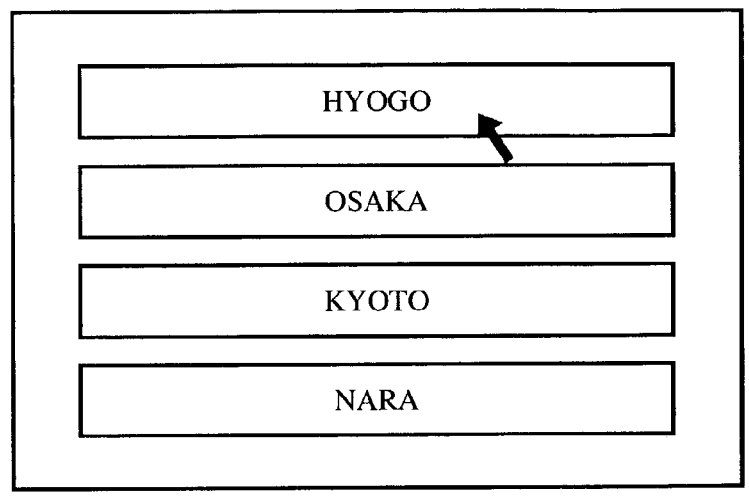
FIG. 37 is an explanatory drawing showing an example of bitmap facility search menu image.

Further, although the touch-sensitive panel 8 is used, the keyboard 2 may be used as well. In this case, as shown in FIG. 37, a cursor to show the input position is displayed on the monitor 3 and by pushing the keys "↑," "↓," "←," "→" of the keyboard 2, the cursor is moved on the screen. Then, by pushing the key "determine," the position coordinates selected by the user may be outputted to the state management unit 12 in the same way as the touch position information by the touch-sensitive panel 8.

Fifth Embodiment

While in the above-described first through fourth embodiments, the car navigation unit 1 is always powered, the power may be constantly supplied only to the communication control unit 23 and, only when a remotely inputted command is transmitted from the PDA 4, the power may be supplied to the indispensable processing units.

Figure 38:
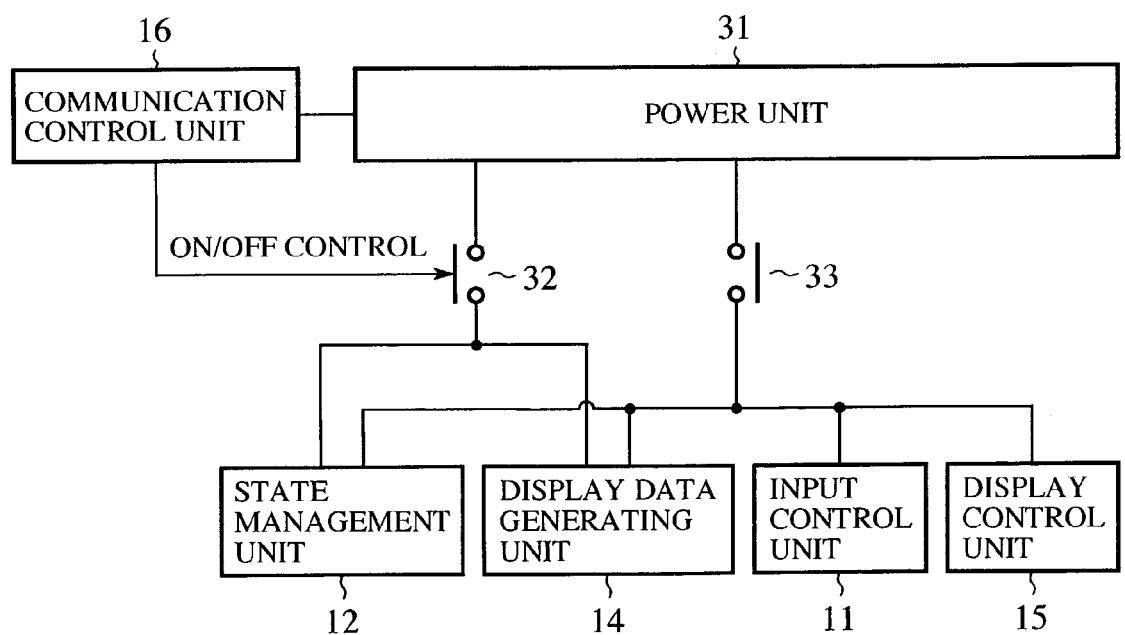
FIG. 38 is a block diagram showing the connection relationship between a power supply unit and each of the processing units in the car navigation unit.

FIG. 38 is a block diagram showing the connection relationship between the power supply unit and each of the processing units in the car navigation unit 1.

The communication unit 16 is normally connected to the power supply unit 31, and the state management unit 12 and the display data generating unit 14 are connected to the power supply unit 31 through a switch 32. The state management unit 12, the display data generating unit 14, the input control unit 11 and the display control unit 15 are connected to the power supply unit 31 through a switch 33.

The communication control unit 16 permits the switch 32 to be turned on and off. At the initial state, both the switches 32, 33 are off.

The operation of the vehicle-mounted navigation system of the fifth embodiment will now be described.

When a connection request is outputted from the PDA 4 to the communication control unit 16, the communication control unit 16 turns the switch 32 on. As a result, the electric power is supplied from the power supply unit 31 to the state management unit 12 and the display data generating unit 14.

Once the electric connection to the PDA 4 has established, the communication control unit 16 turns the switch 32 off. As a result, the power from the power supply unit 31 to the state management unit 12 and the display generating unit 14 is stopped.

Alternatively, it is also possible to supply electric power to all the processing units by manually turning the switch 33 on.

The technique of remotely turning on and off a switch of a personal computer has already been established by using the technology of "Wake ON LAN" or "Wake ON MODEM." Therefore, by this kind of technology, the switch 32 can be remotely controlled.

According to the fifth embodiment, in the car navigation unit 1, the electric power is supplied to the indispensable units only when the connection is established with the PDA 4. Therefore, when the electric power is not supplied (i.e., in an idle state), it does without consumption of unnecessary electric power, thus preventing the battery charge drop.

In the fifth embodiment, electric power is supplied only to the indispensable units for the remote control from the PDA 4. Only one switch may be provided so that the electric power is supplied to all the processing units by the control of the communication control unit 16. In this case, surplus electric power is consumed by the display control unit 15 and the input control unit 11 when connection is established with the PDA 4. It is, however, possible to reduce the switch units in the car navigation unit 1.

In the fifth embodiment, the electric power can be supplied to all the connections with the PDA 4. The PDA 4 may be transmitted a user's own identification (ID), whereas the communication control unit 16 of the car navigation unit 1 may receive the ID of the PDA 4 to place an access restriction so as to judge the permission or prohibition of connection by means of the ID.

Sixth Embodiment

While no particular reference is made in the above-described first through fifth embodiments, the car navigation unit 1 may transmit a car navigation remote control program having described therein the processing of the PDA 4 to the PDA 4.

In the software architecture of the PDA 4 in this sixth embodiment, a Java (registered trademark) virtual machine is operated on an operating system (OS) for the PDA 4. On the virtual Java machine a program described in Java language is executed.

The operation of the vehicle-mounted car navigation system of the sixth embodiment will now be described.

When the PDA 4 is connected to the car navigation unit 1, the car navigation unit 1 transmits the Java Applet to the PDA 4, which enables the remote control of the car navigation unit 1 as with the above-described first through fifth embodiments.

Upon receipt of the Java Applet from the car navigation unit 1, the PDA 4 causes the Java Applet to execute on its own Java virtual machine.

According to the sixth embodiment, since the car navigation unit 1 transmits the software that enables the remote control of the car navigation unit 1 to the PDA 4, it becomes possible to remotely control the PDA 4 even if the PDA 4 is not provided in advance with a software for remote control.

In this sixth embodiment, the software for remote control is transmitted from the car navigation unit 1. The software for remote control may be transmitted from a server separately connected to the Internet.

In addition, in this sixth embodiment, the PDA 4 having mounted thereon the Java virtual machine is adopted as the information unit. Since some of the cellular phones have already mounted thereon the Java virtual machine, such cellular phones may be adopted as the information unit.

Seventh Embodiment

While in the above-described first and second embodiments, without taking into the account the processing capacity of the PDA 4, the car navigation unit 1 generates the display data, the PDA 4 may transmit the specification indicative of its own processing capacity together with the remote control command and, when the car navigation unit 1 receives the specification, it may generate the display data fitted for the PDA 4 in consideration of the processing capacity of the PDA 4.

A specific description will then be given supposing that, the PDA 4 has an ability to display up to three items of the facility data list at the maximum.

The communication control unit 16 of the car navigation unit 1 receives the specification transmitted from the PDA 4 together with the remotely inputted code. The specification is the information contained therein the displayable number of objects. It is supposed here that 3 is described as the displayable number of facility data list items. The specification is outputted to the navigation state management unit 12a.

The navigation control unit 12a outputs the remotely inputted command and the specification received by the communication unit 16 to the facility search unit 12c.

Using a method similar to that in the first embodiment, the facility search unit 12c gets the facility data list from the display data generating unit 14 and cuts, by a method to be mentioned later, the transmission facility data list consisting of the number of pieces (3 pieces in this example) as described in the specification.

Then, the communication facility data list and the items of the "previous page" and the "next page" are combined into the display data (e.g., Osaka, Hyogo, Kyoto, previous page, next page), and the display data is outputted to the communication control unit 16. The operation of the other navigation unit 1 follows the same step as with the first embodiment.

The communication control unit 23 of the PDA 4 transmits the specification that has been set in advance together with the remotely inputted code to the car navigation unit 1.

When the communication control unit 23 receives the display data, the display control unit 24 of the PDA 4 extracts the facility data (items other than "previous page" and "next page") from the display data and generates the bitmap facility search menu image in the same manner as with the first embodiment and also generates the display object as shown in FIG. 39 from the "previous page" and the "next page" which are the remaining portions of the display data.

Thereafter, by pasting the display object to the bitmap facility search menu image, the bitmap facility menu search image shown in FIG. 40 is generated and displayed on the monitor 25.

The object information that is outputted to the input control unit 22 by the display control unit 24 contains therein the information on the display object of the above-described "previous page" and the "next page." The other operations of the PDA 4 follow the same steps as with the first embodiment.

Figure 41:
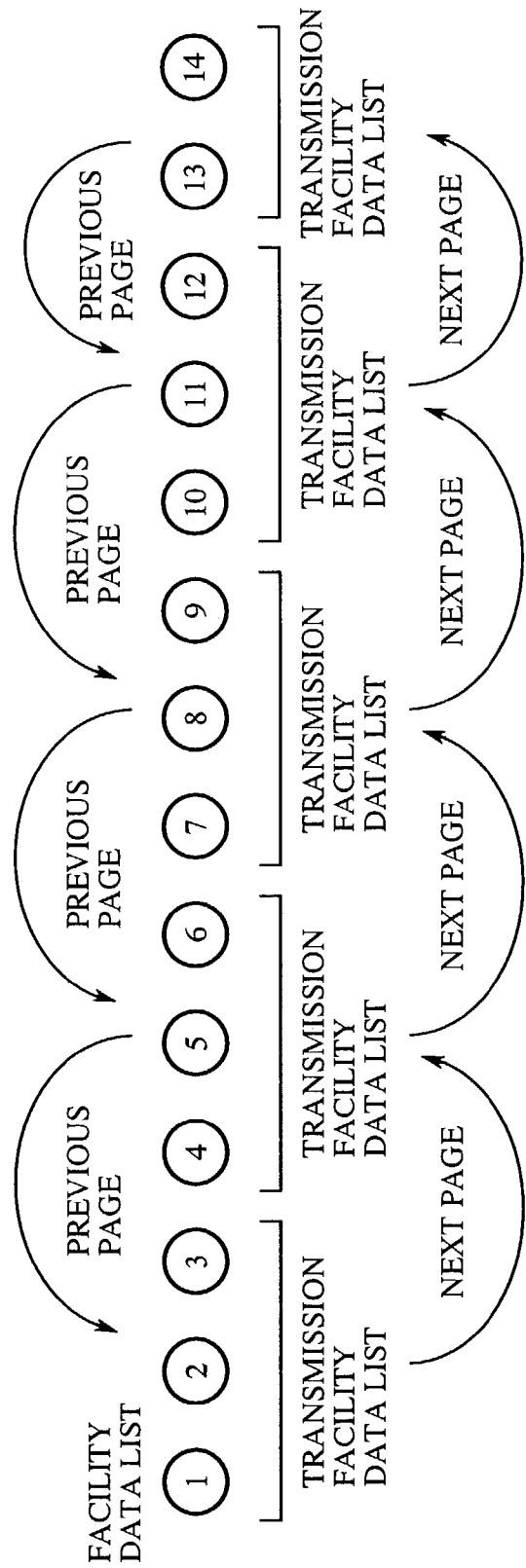
FIG. 41 is an explanatory drawing showing an example of facility data list.

A description will then be given to the cutting of the facility data list in the facility search unit 12c of the car navigation unit 1 by giving an example of the facility data list in FIG. 41. The facility data list in FIG. 41 is the facility data list generated by the display data generating unit 14 by outputting a selected layer to the display data generating unit 14.

Upon receipt of the facility data list from the display data generating unit 14, the facility search unit 12c cuts, as the facility data list, the facility data items ("①," "②," "③") by the number (three) as described in the specification from the head items in the facility data list.

Then, upon receipt, e.g., of "remote: next page" as the remotely inputted command from the navigation state management unit 12a, facility data items ("④,", "⑤," "⑥") for the plural pieces as described in the specification are cut as the facility data list headed by the next data item ("④") of the facility data item transmitted last time.

In case the facility data list transmitted last time are "①," "②," "③" there is no data to be transmitted even if the remotely inputted command of "remote: previous page" is received. Therefore, the facility search unit 12c performs nothing. In case the facility data list transmitted last time are ("④," "⑤," "⑥"), upon receipt of "remote: previous page," three facility data items ("①,""②," "③") are cut by taking the facility data list as a head item, which are positioned at a place three items before the head item of the facility data list transmitted last time.

If there is no facility data item to be transmitted in response to the remotely inputted command of "remote: next page," the facility search unit 12c performs nothing. In case the facility data items to be transmitted in response to the remotely inputted command of "remote: next page" falls short of the number described in the specification (in case of one or two), cutting is made, as it is, of one or more facility data lists. Like in the above-described first embodiment, in case the command of the remotely inputted command is included in the facility data list transmitted last time, the selected layer is updated as steps ST31 and ST32 in FIG. 12 to request a new facility data list from the display data generating unit 14. The same processing as the above may then be applied to the obtained facility data list.

As is apparent from the above descriptions, according to the seventh embodiment, when the PDA 4 transmits the specification indicative of its own processing capacity together with the remotely inputted command and the car navigation unit 1 receives the specification, the display data fitted for the PDA 4 is generated in consideration of the processing capacity of the PDA 4. Therefore, it becomes possible to avoid transmitting the waste display data beyond the processing capacity of the PDA 4. As a result, the efficiency of communication between the car navigation unit 1 and the PDA 4 is improved.

In the seventh embodiment, the display data to be transmitted from the car navigation unit 1 is facility data. Like in the above-described first embodiment, the display data may also be either the route information or the display map data. For example, concerning the route information, the PDA 4 may transmit the number of displayable node objects (see FIG. 17A) to the car navigation unit 1 so that the car navigation unit 1 can generate the facility data information corresponding to the number to transmit them to the PDA 4. Concerning the display map data, the PDA 4 may transmit the number of displayable areas (see FIG. 7) so that the car navigation unit 1 can cut the display map data corresponding to the number of areas as designated by the display map data to transmit them to the PDA 4.

In the above eighth embodiment, the PDA 4 transmits the specification indicative of the processing capacity of the display data to the car navigation unit 1. Alternatively, the PDA 4 transmits its own ID to the car navigation unit 1 and, depending on the ID received by the car navigation unit 1, the permission or prohibition of transmission of the display data may be determined.

In this case, the user registers in advance the ID of the user's own PDA 4 in the car navigation unit 1. By arranging not to transmit the display data to the PDA 4 having an ID other than the one as set by the car navigation unit 1, it is possible to prevent a person other than the user from remotely controlling the car navigation unit 1.

Eighth Embodiment

Figure 42:
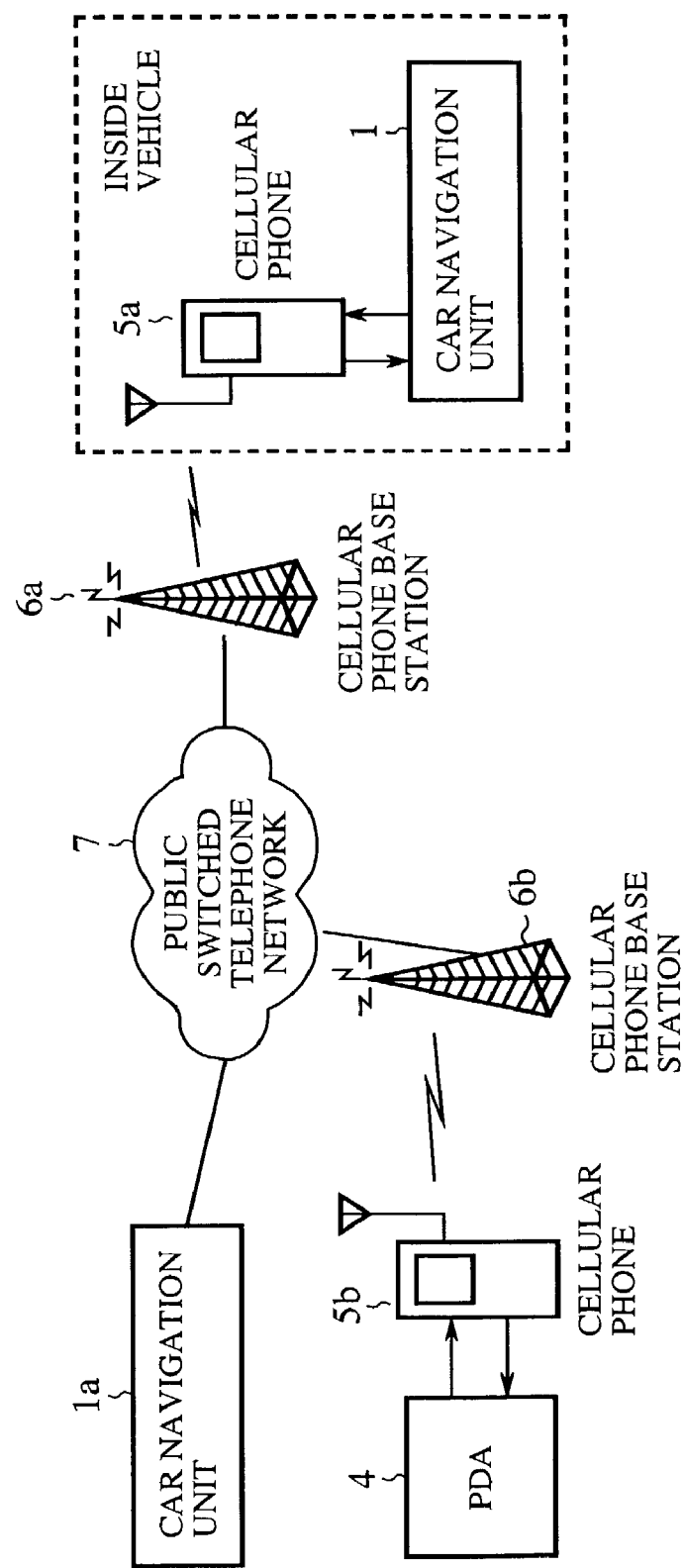
FIG. 42 is a block diagram showing a vehicle-mounted information system according to an eighth embodiment of this invention.

While in the above-described first through seventh embodiments, the car navigation unit 1 and the PDA 4 perform direct communication with each other, as shown in FIG. 42, a car navigation unit (information processing unit) 1a with capabilities similar to those of the car navigation unit 1 is separately provided outside a vehicle. By performing communication between the PDA 4 and the car navigation unit 1a, in the same manner as with the first embodiment, the routing is done by the car navigation unit 1a. Thereafter, the car navigation unit 1 inside the vehicle is connected to the car navigation unit 1a. The route set by the PDA 4 is thus downloaded to the car navigation unit 1a, whereby the route may be set to the car navigation unit 1 inside the vehicle.

It is assumed that the PDA 4 cannot be directly connected to the car navigation unit 1 since the later is not always powered.

The operation of the eighth embodiment will now be described.

First, the car navigation unit 1a and the PDA 4 perform communication with each other. Thus, like in the above-described first through seventh embodiments, the car navigation unit 1a generates the route information (see FIG. 14). The route information is then stored in the internal memory of the car navigation unit 1a.

Then, if the car navigation unit 1 is powered when the user has got onboard the vehicle, the car navigation unit 1 downloads, in a manner to be mentioned later, the route information stored in the internal memory of the car navigation unit 1a.

As the method of downloading the route information from the car navigation unit 1a, the following may be-considered.

The car navigation unit 1a transmits an E-mail having described therein the route information to the cellular phone 5a connected to the car navigation unit 1. The car navigation unit 1 thus gets the E-mail data from the cellular phone 5a, thereby downloading the route information.

As described above, according to the eighth embodiment, by performing communication between the PDA 4 and the car navigation unit 1a outside the vehicle, the routing in the car navigation unit 1a is done. Thereafter, by connecting the car navigation unit 1 inside the vehicle to the car navigation unit 1a, the route set by the PDA 4 is downloaded to the car navigation unit 1a, whereby the route is set to the car navigation unit inside the vehicle. In this manner, since there is no need of constantly supplying electric power to the car navigation unit 1, the battery charge drop in the car navigation unit 1 can be prevented.

In this eighth embodiment, the car navigation unit 1a may be mounted on a personal computer (PC).

Further, in this eighth embodiment, the car navigation unit 1a may be connectable with two communication equipments, one of which with the PDA 4 and the other of which with the car navigation unit 1.

Figure 43:
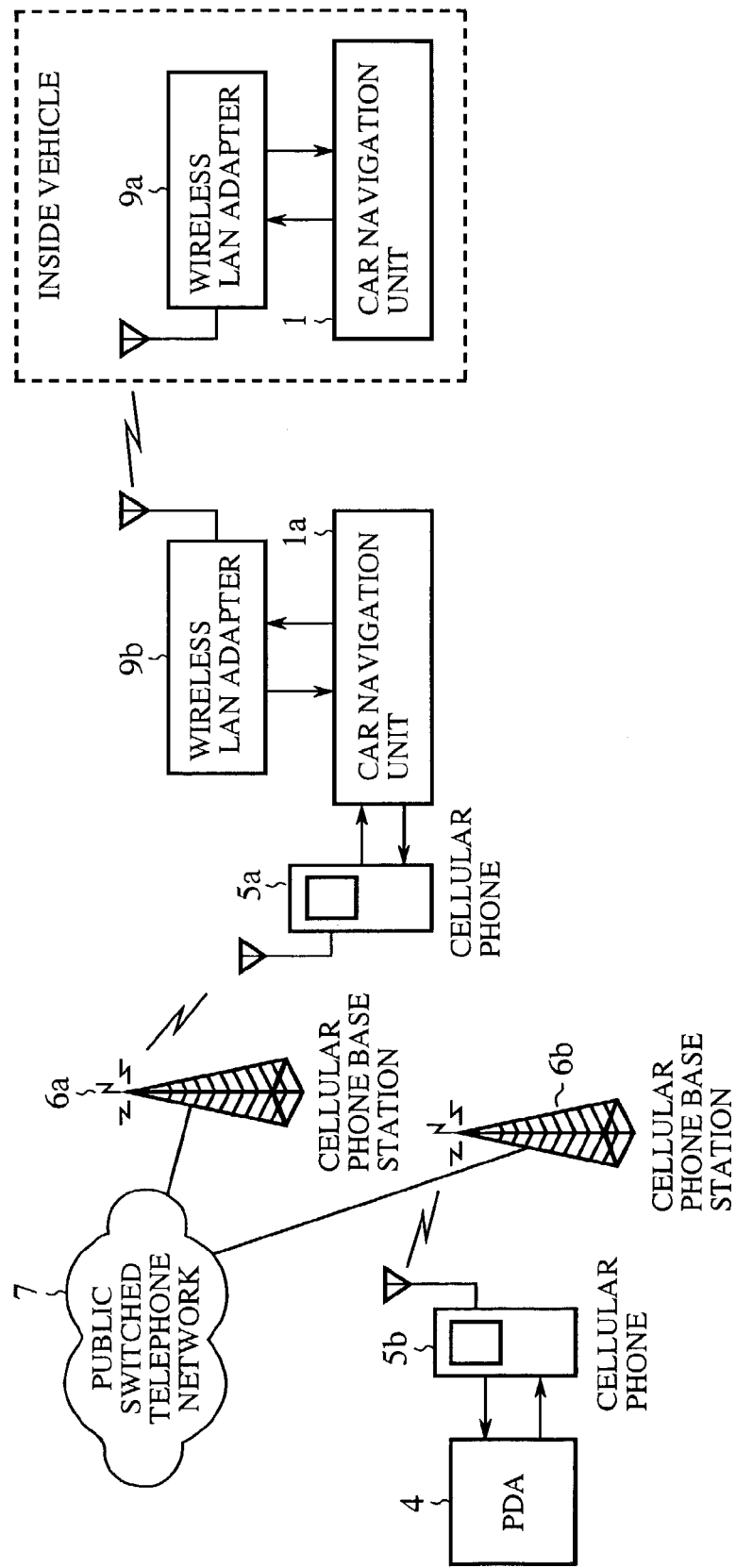
FIG. 43 is a block diagram showing a vehicle-mounted information system according to an eighth embodiment.

In FIG. 43, the car navigation unit 1 and the car navigation unit 1a are connected to each other through a wireless LAN unit 9a, 9b. The car navigation unit 1a and the PDA 4 are connected to each other through the public switched telephone network 7.

It is readily apparent that the above-described vehicle-mounted equipment, an information unit, and a vehicle-mounted information system meet all of the objects mentioned above and also has the advantage of wide commercial utility. It should be understood that the specific form of the invention herein above described is intended to be representative only, as certain modifications within the scope of these teachings will be apparent to those skilled in the art.

Accordingly, reference should be made to the following claims in determining the full scope of the invention.

What is claimed is:

1. A vehicle-mounted equipment comprising:
   command generating means for generating commands corresponding to an input signal;
   receiving means for receiving commands transmitted from an information unit;
   data generating means for generating display data by interpreting a command when the command is output from said command generating means or when the command is received by said receiving means;
   display means for, when the command is output from said command generating means, displaying a screen, based on the display data generated by said data generating means, wherein said data generating means generates display data including layout information of the screen; and
   transmitting means for, when the command is received by said receiving means, transmitting the display data generated by said data generating means to the information unit, wherein the layout information produces a layout of the display data, including the layout of at least a map and a command interface, on a display means of the information unit that is substantially identical to a layout of the display data on said display means of said vehicle-mounted equipment.

2. The vehicle-mounted equipment according to claim 1, wherein said data generating means generates a bitmap image as the display data.

3. The vehicle-mounted equipment according to claim 1, wherein, when said receiving means receives a specification indicative of processing capacity of the information unit upon receiving the command, said data generating means generates display data fitted for the information unit in consideration of the processing capacity of the information unit.

4. An information unit comprising:
   command generating means for generating a command corresponding to an input signal;
   communication means for transmitting the command output from said command generating means to a vehicle-mounted equipment, and for receiving display data transmitted from the vehicle-mounted equipment; and
   display means for displaying a screen based on display data received by said communication means, wherein, when said communication means receives display data including layout information of screen, said display means sets display position of the screen based on the layout information, and the layout information produces a layout of the display data, including the layout of at least a map and a command interface, on the display means that is substantially identical to a layout of the display data on a display means of the vehicle-mounted equipment.

5. The information unit according to claim 4, wherein, when said communication means receives display data which is a bitmap image, said display means display the bitmap image without generating the screen data from the display data.

6. The information unit according to claim 4, wherein, when the command generated by said command generating means is transmitted to the vehicle-mounted equipment, said communication means transmits a specification indicative of processing capacity of said communication means to the vehicle-mounted equipment.

7. A vehicle-mounted information system comprising:

a vehicle-mounted equipment which, upon receipt of a command, generates display data by interpreting the command and transmits the display data; and an information unit which transmits the command and which, upon receipt of the display data from said vehicle-mounted equipment, displays a screen based on the display data, wherein the display data includes layout information of the screen, the layout information producing a layout, including the layout of at least a map and a command interface, on the screen that is substantially identical to a layout of the display data on a display means of said vehicle-mounted equipment.

8. The vehicle-mounted information system according to claim 7, wherein, when an information processing unit with capabilities similar to those of said vehicle-mounted equipment is provided outside a vehicle including said vehicle-mounted equipment, said information unit receives, in place of said vehicle-mounted equipment, a command transmitted from said information unit, and transmits setting information of said information processing unit to said vehicle-mounted equipment.

* * * * *